United States Patent
Wang et al.

(10) Patent No.: US 12,149,433 B2
(45) Date of Patent: Nov. 19, 2024

(54) PACKET PROCESSING METHOD AND RELATED APPARATUS

(71) Applicant: Huawei Technologies Co., Ltd., Guangdong (CN)

(72) Inventors: Haibo Wang, Beijing (CN); Yi Zeng, Beijing (CN); Rongrong Hua, Nanjing (CN); Tong Zhu, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 401 days.

(21) Appl. No.: 17/645,403

(22) Filed: Dec. 21, 2021

(65) Prior Publication Data
US 2022/0210049 A1 Jun. 30, 2022

(30) Foreign Application Priority Data

Dec. 29, 2020 (CN) .......................... 202011602728.3

(51) Int. Cl.
| | |
|---|---|
| *H04L 45/16* | (2022.01) |
| *H04L 12/46* | (2006.01) |
| *H04L 45/302* | (2022.01) |
| *H04L 47/2425* | (2022.01) |
| *H04L 47/6275* | (2022.01) |

(52) U.S. Cl.
CPC ............ *H04L 45/16* (2013.01); *H04L 45/302* (2013.01); *H04L 45/306* (2013.01); *H04L 47/2425* (2013.01); *H04L 47/6275* (2013.01); *H04L 12/4641* (2013.01)

(58) Field of Classification Search
CPC ..... H04L 45/16; H04L 45/302; H04L 45/306; H04L 47/2425; H04L 47/6275; H04L 12/4641
See application file for complete search history.

(56) References Cited

U.S. PATENT DOCUMENTS

| | | | |
|---|---|---|---|
| 8,650,286 B1 * | 2/2014 | Sajassi ................. | H04L 45/18 709/224 |
| 10,116,467 B2 | 10/2018 | Brissette et al. | |

(Continued)

FOREIGN PATENT DOCUMENTS

| | | |
|---|---|---|
| CN | 102301657 A | 12/2011 |
| CN | 105490957 A | 4/2016 |

(Continued)

*Primary Examiner* — Kent Krueger
(74) *Attorney, Agent, or Firm* — WOMBLE BOND DICKINSON (US) LLP

(57) ABSTRACT

A packet processing method and a network device are provided. The method is applied to a network system, and the network system includes a first network device and a plurality of network devices separately connected to the first network device. The method includes: The first network device groups the plurality of network devices into a plurality of groups based on a service, where each of the plurality of groups includes at least one network device. The first network device determines one or more groups in the plurality of groups, and forwards packets of the service to one or more of the plurality of network devices in the one or more groups. In present application, a mode for forwarding the packets of the service can be flexibly selected according to a service requirement, to better meet the service requirement.

20 Claims, 11 Drawing Sheets

(56) References Cited

U.S. PATENT DOCUMENTS

| | | |
|---|---|---|
| 10,454,715 B1 | 10/2019 | Uttaro et al. |
| 10,454,814 B2 | 10/2019 | Brissette et al. |
| 10,693,679 B2 | 6/2020 | Lin et al. |
| 11,362,941 B2* | 6/2022 | Dutta ................ H04L 45/16 |
| 2012/0201124 A1 | 8/2012 | Marques et al. |
| 2014/0369186 A1* | 12/2014 | Ernstrom ............ H04L 49/55 |
| | | 370/228 |
| 2017/0141963 A1 | 5/2017 | Chalapathy et al. |
| 2017/0230197 A1* | 8/2017 | Zhang ................ H04L 45/64 |
| 2018/0109400 A1 | 4/2018 | Brissette et al. |
| 2018/0359178 A1* | 12/2018 | Brissette ............ H04L 45/22 |
| 2019/0342119 A1 | 11/2019 | Uttaro et al. |
| 2019/0356581 A1 | 11/2019 | Brissette et al. |
| 2019/0394066 A1 | 12/2019 | Lin et al. |
| 2021/0243116 A1* | 8/2021 | Filsfils ............ H04L 45/566 |

FOREIGN PATENT DOCUMENTS

| | | |
|---|---|---|
| EP | 3197107 A1 | 7/2017 |
| WO | 2013148303 A1 | 10/2013 |
| WO | 2019202087 A1 | 10/2019 |

* cited by examiner

CE: Customer edge
PE: Provider edge

201

A first network device classifies a plurality of network devices into a plurality of groups based on a service, where each of the plurality of groups includes at least one network device, and the plurality of groups are used to forward packets of the service

202

The first network device determines one or more groups in the plurality of groups, and forwards the packets of the service to one or more of the plurality of network devices based on the one or more groups

FIG. 2

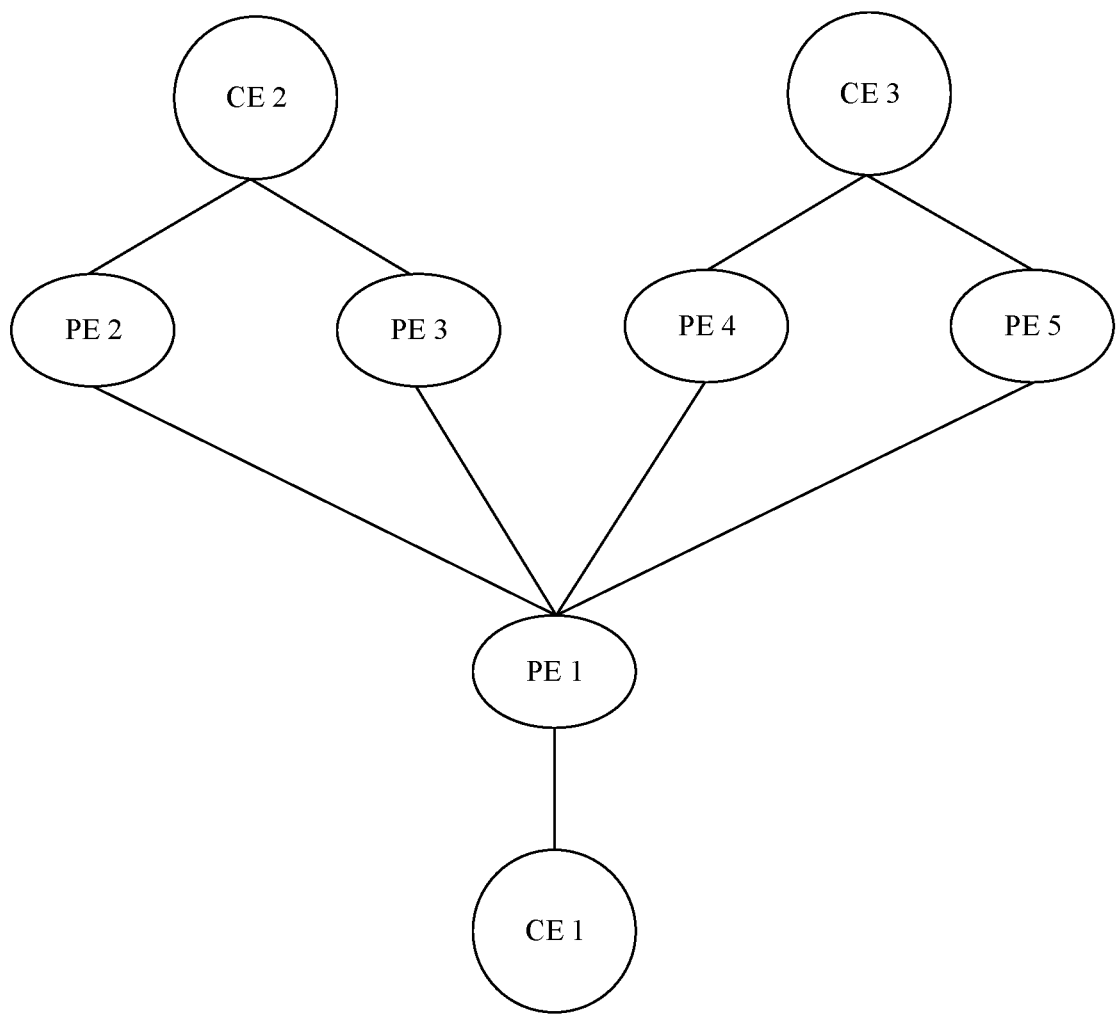

FIG. 3

PACKET PROCESSING METHOD AND RELATED APPARATUS

CROSS-REFERENCE TO RELATED APPLICATIONS

This application claims priority to Chinese Patent Application No. 202011602728.3, filed on Dec. 29, 2020, which is hereby incorporated by reference in its entirety.

TECHNICAL FIELD

This application relates to the field of communications technologies, and in particular, to a packet processing method and a related apparatus.

BACKGROUND

An Ethernet virtual private network (EVPN) virtual private wire service (VPWS) is an EVPN-based virtual private line technology, and inherits advantages such as active-active and fast convergence of an EVPN while carrying a private wire service.

However, a current virtual private wire service is deployed simply. As a result, some service requirements cannot be met.

SUMMARY

This application provides a packet processing method. In the method, a plurality of network devices configured to forward packets of a same service are classified, and during forwarding of the packets of the service, one or more groups may be selected from a plurality of groups obtained through classification to forward the packets of the service. Therefore, a mode for forwarding the packets of the service can be flexibly selected according to a service requirement, to better meet the service requirement.

A first aspect of this application provides a packet processing method. The method is applied to a network system, and the network system includes a first network device and a plurality of network devices separately connected to the first network device. For example, the network system may be an EVPN, and the EVPN supports VPWS access. In this case, a service obtained by the first network device may be an EVPN VPWS. The first network device and the plurality of network devices connected to the first network device in the network system each may be a provider edge (PE).

The packet processing method includes: The first network device classifies the plurality of network devices into a plurality of groups based on a service, where each of the plurality of groups includes at least one network device, and the plurality of groups are used to forward packets of the service. Each of the plurality of network devices connected to the first network device is related to the same service obtained by the first network device, and may be configured to forward the packets of the same service. The first network device determines one or more groups in the plurality of groups, and forwards the packets of the service to one or more of the plurality of network devices based on the one or more groups, where the one or more of the plurality of network devices belong to the one or more groups. The packets of the service are one or more packets that are related to the service and that are received by the first network device after the plurality of groups are determined based on the service. In other words, after classifying the plurality of network devices into the plurality of groups, the first network device may determine the one or more groups in the plurality of groups, where the one or more groups are used to forward the packets of the service subsequently. In the plurality of groups obtained through classification, a group that is not determined by the first network device is no longer used to forward the packets of the service subsequently.

In the solution, the plurality of network devices configured to forward the packets of the same service are classified, and during forwarding of the packets of the service, the one or more groups may be selected from the plurality of groups obtained through classification to forward the packets of the service. Therefore, a mode for forwarding the packet of the service can be flexibly selected according to service requirements, to better meet the different service requirements.

In an embodiment, that the first network device determines one or more groups in the plurality of groups includes: The first network device determines the one or more groups in the plurality of groups based on an obtained inter-group forwarding mode. The inter-group forwarding mode includes but is not limited to an inter-group active/standby mode and an inter-group load-balancing mode. In the inter-group active/standby mode, different groups are classified as an active group and a standby group. In the inter-group load-balancing mode, different groups are classified as a plurality of groups used for load balancing.

In an embodiment, that the first network device determines the one or more groups in the plurality of groups based on an obtained inter-group forwarding mode includes: The first network device determines, when the obtained inter-group forwarding mode is an inter-group load-balancing mode, a plurality of groups used for load balancing in the plurality of groups, and forwards the packets of the service to a plurality of network devices in the plurality of groups used for load balancing. The plurality of groups used for load balancing may be some of the plurality of groups obtained by the first network device through classification, or all of the plurality of groups obtained by the first network device through classification.

In this solution, the inter-group load-balancing mode is configured for the plurality of groups obtained by the first network device through classification, to implement load balancing of the plurality of groups according to actual requirements, and improve solution applicability.

In an embodiment, that the first network device determines the one or more groups in the plurality of groups based on an obtained inter-group forwarding mode includes: The first network device determines a first group in the plurality of groups when the obtained inter-group forwarding mode is an inter-group active/standby mode, where the first group is a group corresponding to an active mode; and forwards the packets of the service to one or more network devices in the first group. In other words, when the inter-group forwarding mode is the inter-group active/standby mode, the first network device determines the active group in the plurality of groups obtained through classification, and the first network device forwards the packets of the service only to the one or more network devices in the active group in a subsequent packet forwarding process.

In this solution, the inter-group active/standby mode is configured for the plurality of groups obtained by the first network device through classification, to implement active/standby protection of the plurality of groups according to actual requirements, and improve solution applicability. In an embodiment, when the inter-group forwarding mode is the inter-group active/standby mode, the plurality of groups obtained by the first network device through classification further include one or more standby groups in the inter-group active/standby mode, and priorities of the one or more standby groups are the same, or priorities of the one or more standby groups are different. Briefly, when the inter-group forwarding mode is the inter-group active/standby mode, there is only one active group and one or more standby groups in the plurality of groups obtained by the first network device through classification. When there are a plurality of standby groups, the priorities of the plurality of standby groups may be the same, or the priorities of the plurality of standby groups may be different, that is, different standby groups have different priorities.

In an embodiment, after the first network device forwards the packets of the service to one or more network devices in the first group, the method further includes: The first network device determines a second group when the first group is unavailable, where the second group belongs to the one or more standby groups. The first network device forwards the packets of the service to one or more network devices in the second group.

In an embodiment, that the first network device determines a second group when the first group is unavailable includes: The first network device determines the second group and a third group when the first group is unavailable and priorities of the second group and the third group are the same, where the third group belongs to the one or more standby groups. That the first network device forwards the packets of the service to one or more network devices in the second group includes: The first network device forwards the packets of the service to the one or more network devices in the second group and one or more network devices in the third group. In other words, when the active group is unavailable, if the priorities of the plurality of standby groups are the same, the first network device may forward the packets of the service to network devices in the plurality of standby groups with the same priorities. For example, each time the first network device receives a packet of the service, the first network device may randomly select one of the second group and the third group, and forward the packet of the service to a network device in the selected group.

In an embodiment, the determined one or more groups include a first group, and that the first network device forwards the packets of the service to one or more of the plurality of network devices based on the one or more groups includes: The first network device determines, based on an intra-group forwarding mode corresponding to one or more network devices belonging to the first group, the one or more network devices in the first group to forward the packets of the service. The intra-group forwarding mode is an active/standby mode or an all-active mode.

When the intra-group forwarding mode corresponding to the first group is the active/standby mode, the first group includes at least one active device and at least one standby device. When the active device in the first group is available, the first network device determines the active device in the first group to forward the packets of the service; or when the active device in the first group is unavailable, the first network device determines the standby device in the first group to forward the packets of the service.

When the intra-group forwarding mode corresponding to the first group is the all-active mode, the first group includes at least two network devices. The at least two network devices are configured to forward the packets of the service, in other words, the at least two network devices implement load balancing.

In an embodiment, before the first network device determines the one or more groups in the plurality of groups based on an obtained inter-group forwarding mode, the method further includes: The first network device obtains a configuration instruction, where the configuration instruction is used to indicate a plurality of modes corresponding to the plurality of groups. The first network device obtains the inter-group forwarding mode based on the plurality of modes corresponding to the plurality of groups. The first network device obtains the configuration instruction from information configured by operation and maintenance personnel on the first network device. Alternatively, the first network device obtains the configuration instruction by receiving configuration information sent by another network device.

In an embodiment, the packets of the service are sent to one or more user-side devices, and the plurality of network devices included in the plurality of groups each are connected to the one or more user-side devices; or there are a plurality of user-side devices, and network devices in different groups in the plurality of groups are connected to different user-side devices.

Optionally, in a possible implementation, the plurality of groups and a plurality of group identifiers have a one-to-one correspondence. The plurality of group identifiers may be, for example, service identifiers.

In an embodiment, the EVPN supports virtual private wire service (VPWS) access, and that the first network device forwards the packets of the service to one or more of the plurality of network devices based on the one or more groups includes: The first network device forwards, based on the one or more groups, the packets of the service to one or more VPWS instances included in the one or more of the plurality of network devices, where the one or more VPWS instances are used to carry the service.

A second aspect of this application provides a network device. The network device is separately connected to a plurality of network devices, and the network device includes a processing unit and a transceiver unit. The processing unit is configured to classify the plurality of network devices into a plurality of groups based on a service, where each of the plurality of groups includes at least one network device, and the plurality of groups are used to forward packets of the service. The processing unit is further configured to: determine one or more groups in the plurality of groups, and forward, by using the transceiver unit, the packets of the service to one or more of the plurality of network devices based on the one or more groups, where the one or more of the plurality of network devices belong to the one or more groups.

In an embodiment, the processing unit is further configured to determine the one or more groups in the plurality of groups based on an obtained inter-group forwarding mode.

In an embodiment, the processing unit is further configured to: determine, when the obtained inter-group forwarding mode is an inter-group load-balancing mode, a plurality of groups used for load balancing in the plurality of groups, and forward the packets of the service to a plurality of network devices in the plurality of groups used for load balancing.

In an embodiment, the processing unit is further configured to determine a first group in the plurality of groups when the obtained inter-group forwarding mode is an inter-group active/standby mode, where the first group is a group corresponding to an active mode. The transceiver unit is further configured to forward the packets of the service to one or more network devices in the first group.

In an embodiment, the plurality of groups obtained through classification further include one or more standby groups in the inter-group active/standby mode, and priorities of the one or more standby groups are the same, or priorities of the one or more standby groups are different.

In an embodiment, the processing unit is further configured to determine a second group when the first group is unavailable, where the second group belongs to the one or more standby groups. The transceiver unit is further configured to forward the packets of the service to one or more network devices in the second group.

In an embodiment, the processing unit is further configured to determine the second group and a third group when the first group is unavailable and priorities of the second group and the third group are the same, where the third group belongs to the one or more standby groups. The transceiver unit is further configured to forward the packets of the service to the one or more network devices in the second group and one or more network devices in the third group.

In an embodiment, the network device determines, based on an intra-group forwarding mode corresponding to one or more network devices belonging to the first group, the one or more network devices in the first group to forward the packets of the service.

In an embodiment, the intra-group forwarding mode is an active/standby mode or an all-active mode.

In an embodiment, the network device further includes an obtaining unit. The obtaining unit is configured to obtain a configuration instruction, where the configuration instruction is used to indicate a plurality of modes corresponding to the plurality of groups. The processing unit is further configured to obtain the inter-group forwarding mode based on the plurality of modes corresponding to the plurality of groups.

In an embodiment, the packets of the service are sent to one or more user-side devices, and the plurality of network devices included in the plurality of groups each are connected to the one or more user-side devices; or there are a plurality of user-side devices, and network devices in different groups in the plurality of groups are connected to different user-side devices.

In an embodiment, the plurality of groups and a plurality of group identifiers have a one-to-one correspondence.

Optionally, in a possible implementation, a network system is an Ethernet virtual private network (EVPN).

In an embodiment, the EVPN supports virtual private wire service (VPWS) access. The processing unit is further configured to forward, based on the one or more groups, the packets of the service to one or more VPWS instances included in the one or more of the plurality of network devices, where the one or more VPWS instances are used to carry the service.

A third aspect of this application provides a network device. The network device includes a processor, configured to enable the network device to implement the method described in any possible implementation of the first aspect. The device may further include a memory. The memory is coupled to the processor. When the processor executes instructions stored in the memory, the network device is enabled to implement the method described in any possible implementation of the first aspect. The device may further include a communications interface. The communications interface is used by the apparatus to communicate with another device. For example, the communications interface may be a transceiver, a circuit, a bus, a module, or a communications interface of another type.

The instructions in the memory in this application may be pre-stored, or may be downloaded from the internet and then stored when the network device is used. Sources of the instructions in the memory are not limited in this application. The coupling in this application is an indirect coupling or a connection between apparatuses, units, or modules, may be in an electrical form, a mechanical form, or another form, and is used for information exchange between the apparatuses, the units, or the modules.

A fourth aspect of this application provides a computer storage medium. The computer storage medium may be non-volatile. The computer storage medium stores computer-readable instructions. When the computer-readable instructions are executed by a processor, the method described in any possible implementation of the first aspect is implemented.

A fifth aspect of this application provides a computer program product including instructions. When the computer program product runs on a computer, the computer is enabled to perform the method described in any possible implementation of the first aspect.

A sixth aspect of this application provides a network system. The network system includes the network device in any implementation of the first aspect and a plurality of network devices connected to the network device in any implementation of the first aspect.

The solutions provided in the second aspect to the sixth aspect are used to implement or cooperate to implement the method provided in the first aspect, and therefore, can achieve beneficial effects the same as or corresponding to those in the first aspect. Details are not described herein again.

BRIEF DESCRIPTION OF DRAWINGS

FIG. 2 is a schematic flowchart of a packet processing method according to an embodiment of this application;

FIG. 3 is a schematic diagram of a structure of a network system according to an embodiment of this application;

DESCRIPTION OF EMBODIMENTS

Figure 1:
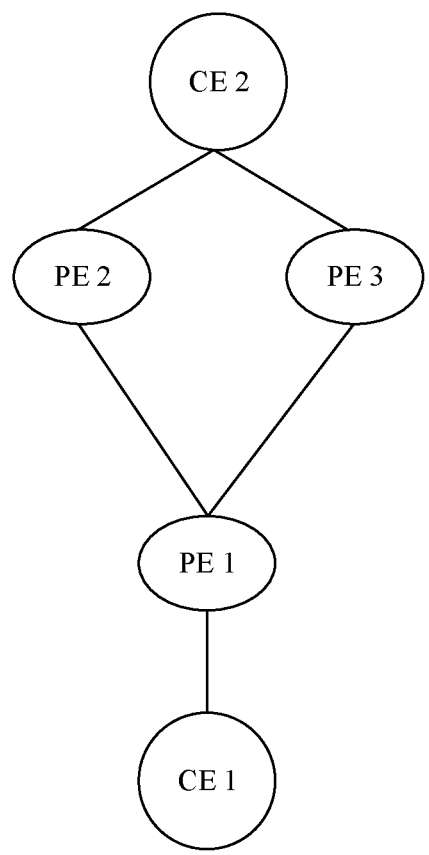
FIG. 1 is a schematic diagram of deployment of an EVPN VPWS service.

To make objectives, technical solutions, and advantages of this application clearer, the following describes embodiments of this application with reference to accompanying drawings. It is clear that, the described embodiments are merely some but not all of the embodiments of this application. A person of ordinary skill in the art may learn that, as a new application scenario emerges, the technical solutions provided in the embodiments of this application are also applicable to a similar technical problem.

In the specification, claims, and accompanying drawings of this application, the terms "first", "second", and the like are intended to distinguish between similar objects but do not necessarily indicate a specific order or sequence. It should be understood that data termed in such a way are interchangeable in appropriate circumstances, so that the embodiments described herein can be implemented in other orders than the content illustrated or described herein. In addition, terms "include" and "have" and any variations thereof are intended to cover non-exclusive inclusions, for example, a process, method, system, product, or device including a series of operations or modules need not be limited to those clearly listed operations or modules, but may include other operations or modules that are not clearly listed or are inherent to these processes, methods, products, or devices. Naming or numbering of operations in this application does not mean that the operations in the method procedures need to be performed in a time/logical order indicated by the naming or numbering. An execution order of the operations in the procedures that have been named or numbered can be changed based on a technical objective to be achieved, as long as same or similar technical effects can be achieved. Division into units in this application is logical division and may be other division in an actual implementation. For example, a plurality of units may be combined or integrated into another system, or some features may be ignored or not performed. In addition, the displayed or discussed mutual couplings or direct couplings or communication connections may be implemented through some interfaces. The indirect couplings or communication connections between the units may be implemented in electronic or other similar forms. This is not limited in this application. In addition, units or subunits described as separate parts may or may not be physically separate, may or may not be physical units, or may be distributed into a plurality of circuit units. Some or all of the units may be selected based on actual requirements to achieve the objectives of the solutions of this application.

A private wire service provides a dedicated channel between two points or between a plurality of points to transmit a packet of a high-traffic service, such as a voice, data, audio, or a video. The private wire service is one of main services carried on a network deployed by a provider. Generally, a range of a city is used as a network domain, and a virtual private network (VPN) is constructed in an internet protocol (IP) bearer network in the existing network domain, to provide a dedicated channel for a packet of the private wire service.

A virtual private wire service is an end-to-end service provided between two points or between a plurality of points by using a software-defined networking (SDN) technology, and dedicated transmission path preferential selection and acceleration technologies. As a supplement to a conventional private wire service, the virtual private wire service can further reduce costs while improving network service quality, thereby providing a more complete network service solution.

An EVPN VPWS is an EVPN-based virtual private line technology, and inherits advantages such as active-active and fast convergence of an EVPN while carrying a private wire service. However, a current virtual private wire service is deployed simply. As a result, some service requirements cannot be met.

FIG. 1 is a schematic diagram of deployment of an EVPN VPWS service. As shown in FIG. 1, the EVPN VPWS service is established between a customer edge (CE) 1 and a CE 2, the CE 1 is connected to a provider edge (PE) 1, the PE 1 is separately connected to a PE 2 and a PE 3, and the PE 2 and the PE 3 are dual-homed to the CE 2. The PE 2 and the PE 3 may be set to be in a single-active mode or an all-active mode according to a service requirement. Based on the deployment, the CE 1 can gain access to the CE 2 and forward a packet of the private wire service to the CE 2.

However, in some scenarios, the CE 1 gains access to, by using the PE 2 and the PE 3, the CE 2 that establishes the EVPN VPWS service with the CE 1, and the CE 1 may further gain access to, by using another PE, the CE 2 or another CE that establishes the EVPN VPWS service with the CE 1. In this scenario, a user often needs to select, based on an actual condition, a mode for the CE 1 to gain access to the EVPN VPWS service. For example, the CE 1 first gains access to the CE 2. If the CE 2 fails, the CE 1 gains access to the another CE that establishes the EVPN VPWS service with the CE 1. Alternatively, the CE 1 may randomly gain access to any CE that establishes the EVPN VPWS service with the CE.

In conclusion, the current virtual private wire service is deployed simply. As a result, service requirements in some scenarios cannot be met.

In view of this, the embodiments of this application provide a packet processing method in which a plurality of network devices configured to forward packets of a same service are classified, and during forwarding of the packets of the service, one or more groups may be selected from the plurality of groups obtained through classification to forward the packets of the service. Therefore, a mode for forwarding the packets of the service can be flexibly selected according to a service requirement, to better meet the service requirement.

The foregoing uses the deployment scenario of the virtual private wire service as an example to describe a scenario to which the packet processing method provided in the embodiments of this application is applied. It may be understood that the packet processing method provided in the embodiments of this application may also be applied to another service scenario with dual-homing access or multi-homing access. A service scenario to which the embodiments of this application are applied is not uniquely limited herein.

FIG. 2 is a schematic flowchart of a packet processing method according to an embodiment of this application. The packet processing method provided in this embodiment of this application is applied to a network system, and the network system includes a first network device and a plurality of network devices separately connected to the first network device. The packet processing method includes at least the following operations 201 and 202.

Operation 201: The first network device classifies the plurality of network devices into a plurality of groups based on a service, where each of the plurality of groups includes at least one network device, and the plurality of groups are used to forward packets of the service.

In this embodiment, the first network device and the plurality of network devices connected to the first network device in the network system each may be, for example, a physical device such as a router, a switch, or a gateway, or may be a virtual device that supports packet forwarding. Specific types of the first network device and the plurality of network devices are not limited in this embodiment.

For example, the network system may be an EVPN, and the EVPN supports VPWS access. In this case, a service obtained by the first network device may be an EVPN VPWS. The first network device and the plurality of network devices connected to the first network device in the network system each may be a PE.

In the network system, each of the plurality of network devices connected to the first network device is related to the service obtained by the first network device. The plurality of network devices may be configured to receive the packets of the service sent by the first network device, and forward the packets of the service. In other words, each of the plurality of network devices connected to the first network device is related to the same service obtained by the first network device, and may be configured to forward the packets of the same service.

Briefly, the plurality of groups obtained by the first network device through classification are used to forward the packets of the service. The packets of the service may be a plurality of packets belonging to the same service, in other words, the plurality of packets forwarded by the plurality of groups correspond to a same service type. The plurality of packets belonging to the same type of service may be separately forwarded by the network devices in the plurality of groups.

The same service may be a service obtained by the first network device from a same network device. Correspondingly, packets of a service that are received by the first network device from the same network device are packets corresponding to a same service. For example, packets of a service that are received by the first network device from a second network device belong to packets corresponding to a same service, but packets of a service that are received by the first network device from a third network device belong to packets corresponding to another service. The same service may alternatively be a same type of service. Correspondingly, packets of a same type of service that are received by the first network device are packets corresponding to a same service. For example, packets of a dial-up access service that are received by the first network device belong to packets of a same service. The same service may alternatively be a service that is determined to falling with a range of a same service according to a rule specified according to another requirement.

Based on this, the first network device may classify the plurality of network devices into the plurality of groups based on correlation between the plurality of network devices and the service. Each of the plurality of groups includes at least one network device, and the plurality of groups may be used to forward the packets of the service. Briefly, the plurality of network devices are configured to forward the packets of the same service, and therefore the first network device classifies the plurality of network devices related to the same service into the plurality of groups.

For example, when the first network device determines that the plurality of network devices connected to the first network device are related to a service A, and the plurality of network devices are configured to forward packets of the service A, the first network device classifies the plurality of network devices into two groups. The two groups each include at least one network device, and the two groups are used to forward the packets of the service A.

Operation 202: The first network device determines one or more groups in the plurality of groups, and forwards the packets of the service to one or more of the plurality of network devices based on the one or more groups, where the one or more of the plurality of network devices belong to the one or more groups.

After classifying the plurality of network devices into the plurality of groups, the first network device may determine the one or more groups in the plurality of groups, where the one or more groups are used to forward packets of the service subsequently. In the plurality of groups obtained through classification, a group that is not determined by the first network device is no longer used to forward the packets of the service subsequently. In this case, when the first network device obtains the packets of the service, the first network device forwards the packets of the service to the network devices in the determined one or more groups based on the one or more groups. The packets of the service are one or more packets that are related to the service and that are received by the first network device after the plurality of groups are determined based on the service.

In an embodiment, after the first network device classifies the plurality of network devices into three groups based on a service B, the first network device determines two of the three groups that are used to forward packets of the service B subsequently. In this case, when the first network device receives the packets of the service B subsequently, the first network device may forward the packets of the service B to network devices in the two determined groups. For a group that is not determined by the first network device from the three groups, the group is no longer used to forward the packets of the service B subsequently. In other words, when receiving the packets of the service B subsequently, the first network device forwards the packets of the service B by using only the two determined groups rather than by using this group.

In an embodiment, the first network device may determine the one or more groups in the plurality of groups based on an obtained inter-group forwarding mode. The inter-group forwarding mode includes but is not limited to an inter-group active/standby mode and an inter-group load-balancing mode.

In the inter-group active/standby mode, different groups are classified as an active group and a standby group. In a process of forwarding a packet of a service, the first network device preferably forwards the packet of the service to a network device in the active group, and the first network device forwards the packet of the service to a network device in the standby group when the active group is unavailable.

In the inter-group load-balancing mode, different groups are classified as a plurality of groups used for load balancing. In a process of forwarding a packet of a service, the first network device randomly selects a network device in the plurality of groups used for load balancing to forward the packet of the service.

In a possible example, the first network device determines, when the obtained inter-group forwarding mode is the inter-group load-balancing mode, the plurality of groups used for load balancing in the plurality of groups, and forwards the packets of the service to the plurality of network devices in the plurality of groups used for load balancing. After the first network device determines the plurality of groups used for load balancing, when the first network device receives the packets of the service corresponding to the plurality of groups, the first network device selects, according to a load balancing policy, one of the plurality of groups used for load balancing, and forwards the received packets of the service to a network device in the selected group.

The plurality of groups used for load balancing may be some of the plurality of groups obtained by the first network device through classification, or all of the plurality of groups obtained by the first network device through classification. For example, it is assumed that the first network device classifies the plurality of network devices into three groups (a group A, a group B, and a group C) based on the service. The first network device may determine, based on the inter-group load-balancing mode, that two of the three groups are used for load balancing. For example, the first network device determines, in the three groups, that the group A and the group B are used for load balancing. Alternatively, the first network device may determine, based on the inter-group load-balancing mode, that all of the three groups are used for load balancing, that is, all of the group A, the group B, and the group C are groups used for load balancing.

In another possible example, the first network device determines a first group in the plurality of groups when the obtained inter-group forwarding mode is the inter-group active/standby mode. The first group is a group corresponding to an active mode, that is, the first group is an active group. The first group includes one or more network devices, and the first network device forwards the packets of the service to the one or more network devices in the first group. In other words, when the inter-group forwarding mode is the inter-group active/standby mode, the first network device determines the active group in the plurality of groups obtained through classification, and the first network device forwards the packets of the service only to the one or more network devices in the active group in a subsequent packet forwarding process.

In an embodiment, when the inter-group forwarding mode is the inter-group active/standby mode, the plurality of groups obtained by the first network device through classification further include one or more standby groups in the inter-group active/standby mode. Priorities of the one or more standby groups are the same, or priorities of the one or more standby groups are different.

Briefly, when the inter-group forwarding mode is the inter-group active/standby mode, there is only one active group and one or more standby groups in the plurality of groups obtained by the first network device through classification. When there are a plurality of standby groups, priorities of the plurality of standby groups may be the same, or priorities of the plurality of standby groups may be different, that is, different standby groups have different priorities.

When the priorities of the plurality of standby groups are the same, after the first network device determines that the active group is unavailable, the first network device may determine one or more standby groups in the plurality of standby groups, and forward the packets of the service to network devices in the determined one or more standby groups. When the priorities of the plurality of standby groups are different, after the first network device determines that the active group is unavailable, the first network device determines a standby group with a highest priority in the plurality of standby groups, and forwards the packets of the service to a network device in the standby group with the highest priority.

For example, after the first network device forwards the packets of the service to the one or more network devices in the first group, the first network device determines a second group when the first group is unavailable. The first network device forwards the packets of the service to one or more network devices in the second group. The second group belongs to the one or more standby groups, and the first network device determines, in the one or more standby groups, the second group that is used to forward the packets of the service subsequently. When there are the plurality of standby groups, the second group may be the only one group in the plurality of standby groups that is determined to be used to forward the packets of the service subsequently; or the second group may be one of a plurality of groups that are determined to be used to forward the packets of the service subsequently. In other words, in addition to the second group, another standby group is determined to be used to forward the packets of the service subsequently.

For example, it is assumed that the active group is a group A, and the standby groups include a group B and a group C. If the active group is unavailable, the first network device may determine only the group B to be used to forward the packets of the service subsequently, or the first network device may determine both the group B and the group C to be used to forward the packets of the service subsequently.

In an embodiment, the first network device determines the second group and a third group when the first group is unavailable and priorities of the second group and the third group are the same. The first network device forwards the packets of the service to the one or more network devices in the second group and one or more network devices in the third group. Both the second group and the third group are standby groups. In other words, when the active group is unavailable, if the priorities of the plurality of standby groups are the same, the first network device may forward the packets of the service to network devices in the plurality of standby groups with the same priorities. For example, each time the first network device receives a packet of the service, the first network device may randomly select one of the second group and the third group, and forward the packet of the service to a network device in the selected group.

In an embodiment, the first network device determines the second group when the first group is unavailable and a priority of the second group is higher than a priority of a third group. The first network device forwards the packets of the service to the one or more network devices in the second group. Both the second group and the third group are standby groups. In other words, when the active group is unavailable, if the priorities of the plurality of standby groups are different, the first network device may determine a standby group with a highest priority, and forward the packets of the service to a network device in the standby group with the highest priority.

It should be understood that for the plurality of standby groups, the plurality of standby groups may have same priorities, the plurality of standby groups may have different priorities, or some of the plurality of standby groups have same priorities, and others have different priorities. For example, two of three standby groups have same priorities, and priorities of the two standby groups are higher than a priority of a remaining standby group. In this case, the first network device may determine the two standby groups with the same priority, and forward the packets of the service to network devices in the two standby groups with the same priority.

In conclusion, when the inter-group forwarding mode is the inter-group active/standby mode, and the active group is unavailable, the first network device may determine, based on the priorities of the standby groups, one or more standby groups with a highest priority, and forward the packets of the service to the network devices in the one or more standby groups with the highest priority.

In this embodiment, there may be a plurality of cases in which the first group is unavailable.

In an embodiment, that the first group is unavailable is that all network devices in the first group are unavailable. For example, when all the network devices in the first group are configured to be available for forwarding the packets of the service, but all the network devices in the first group are faulty, the first group is determined to be unavailable.

In an embodiment, that the first group is unavailable is that some network devices in the first group are unavailable. For example, when all network devices in the first group are configured to be available for forwarding the packets of the service, if a preset proportion of network devices in the first group are unavailable, the first group is determined to be unavailable. The preset proportion may be a value determined or adjusted based on an actual condition. For example, when the preset proportion is 50%, if the first group includes three network devices, and two network devices are unavailable, the first group is determined to be unavailable. For another example, when only some network devices in the first group are configured to be available for forwarding the packets of the service, and the network devices are unavailable, the first group is determined to be unavailable. For example, only two network devices in the first group are separately configured as an active device and a standby device, and another network device in the first group is not configured to be available for forwarding the packets of the service. In this case, when the two network devices configured as the active device and the standby device are unavailable, the first group is determined to be unavailable.

The foregoing describes a process in which the first network device determines, based on the obtained inter-group forwarding mode, the group in the plurality of groups used to forward the packets of the service. The following describes a process in which the first network device forwards the packets of the service to a network device in the determined group after determining the group.

In an embodiment, the one or more groups determined by the first network device in the plurality of groups obtained through classification include the first group. The first network device determines, based on an intra-group forwarding mode corresponding to one or more network devices belonging to the first group, the one or more network devices in the first group to forward the packets of the service. The intra-group forwarding mode may be a forwarding mode such as an active/standby mode or an all-active mode.

When the intra-group forwarding mode corresponding to the first group is the active/standby mode, the first group includes at least one active device and one standby device. When the active device in the first group is available, the first network device determines the active device in the first group to forward the packets of the service; or when the active device in the first group is unavailable, the first network device determines the standby device in the first group to forward the packets of the service.

When the intra-group forwarding mode corresponding to the first group is the all-active mode, the first group includes at least two network devices. The at least two network devices are configured to forward the packets of the service, in other words, the at least two network devices implement load balancing. In this case, the first network device may determine, according to a load balancing policy, one network device in the first group to forward the packets of the service. For example, each time the first network device receives a packet of the service, the first network device randomly determines one network device in the first group to forward the packet of the service.

In other words, for the plurality of groups obtained by the first network device through classification, the plurality of groups have corresponding inter-group forwarding modes, and each of the plurality of groups may further have a corresponding intra-group forwarding mode. In the process in which the first network device forwards the packets of the service, the first network device determines the one or more groups based on the inter-group forwarding mode, and then determines, based on intra-group forwarding modes corresponding to the one or more groups, the one or more network devices in the one or more groups to forward the packets of the service.

For ease of understanding, the following describes a packet processing method provided in an embodiment of this application with reference to a specific application scenario.

The packet processing method provided in this embodiment of this application is applied to a network system, and the network system includes a first network device and a plurality of network devices separately connected to the first network device. The first network device is further connected to a second network device. The plurality of network devices are further connected to a target network device that establishes a VPWS with the second network device. The second network device transmits a packet to the target network device by using the first network device and the plurality of network devices, to implement the VPWS between the second network device and the target network device. Optionally, the network system may be an EVPN, and the EVPN supports VPWS access. In this case, an EVPN VPWS is established between the second network device and the target network device.

In an embodiment, both the second network device and the target network device are customer-side devices. For example, both the second network device and the target network device are CEs. The first network device and the plurality of network devices connected to the first network device each are provider-side devices. For example, the first network device and the plurality of network devices are all PEs. There may be one or more target network devices that establish an EVPN VPWS with the second network device, and packets of a service from the second network device may be sent to one or more customer-side devices. The plurality of network devices connected to the first network device each may be connected to the one or more customer-side devices. Alternatively, network devices in different groups in a plurality of groups obtained by the first network device through classification are separately connected to different customer-side devices. To be specific, network devices in a same group are connected to a same customer-side device, and network devices in different groups are connected to different customer-side devices.

The plurality of network devices connected to the first network device each may include a VPWS instance used to carry a service. In a process in which the first network device forwards the packets of the service, the first network device may forward, based on determined one or more groups, the packets of the service to one or more VPWS instances included in one or more network devices in the one or more groups.

In an embodiment, FIG. 3 is a schematic diagram of a structure of a network system according to an embodiment of this application. As shown in FIG. 3, a CE 1 is connected to a PE 1, the PE 1 is separately connected to a PE 2, a PE 3, a PE 4, and a PE 5, the PE 2 and the PE 3 are further connected to a CE 2, and the PE 4 and the PE 5 are further connected to a CE 3. The CE 1 is the second network device. The PE 1 is the first network device. The PE 2, the PE 3, the PE 4, and the PE 5 are the plurality of network devices connected to the first network device. The CE 2 and the CE 3 are the target network devices. The CE 1 may establish an EVPN VPWS with a virtual machine device, and the virtual machine device includes the CE 2 and the CE 3. In actual application, the PE 1 classifies the PE 2, the PE 3, the PE 4, and the PE 5 into two groups, where the PE 2 and the PE 3 are classified into a group 1, and the PE 4 and the PE 5 are classified into a group 2. That is, network devices in the group 1 are connected to the CE 2, and network devices in the group 2 are connected to the CE 3. Briefly, the CE 1 establishes the same EVPN VPWS with the CE 2 and the CE 3, and the PE 1 classifies the PEs connected to the CE 2 into a same group, and classifies the PEs connected to the CE 3 into another group. Then, in a process of forwarding packets of the service, the PE 1 may determine one or two groups in the two groups, and forward the packets of the service to corresponding PEs based on the one or two determined groups.

Figure 4:
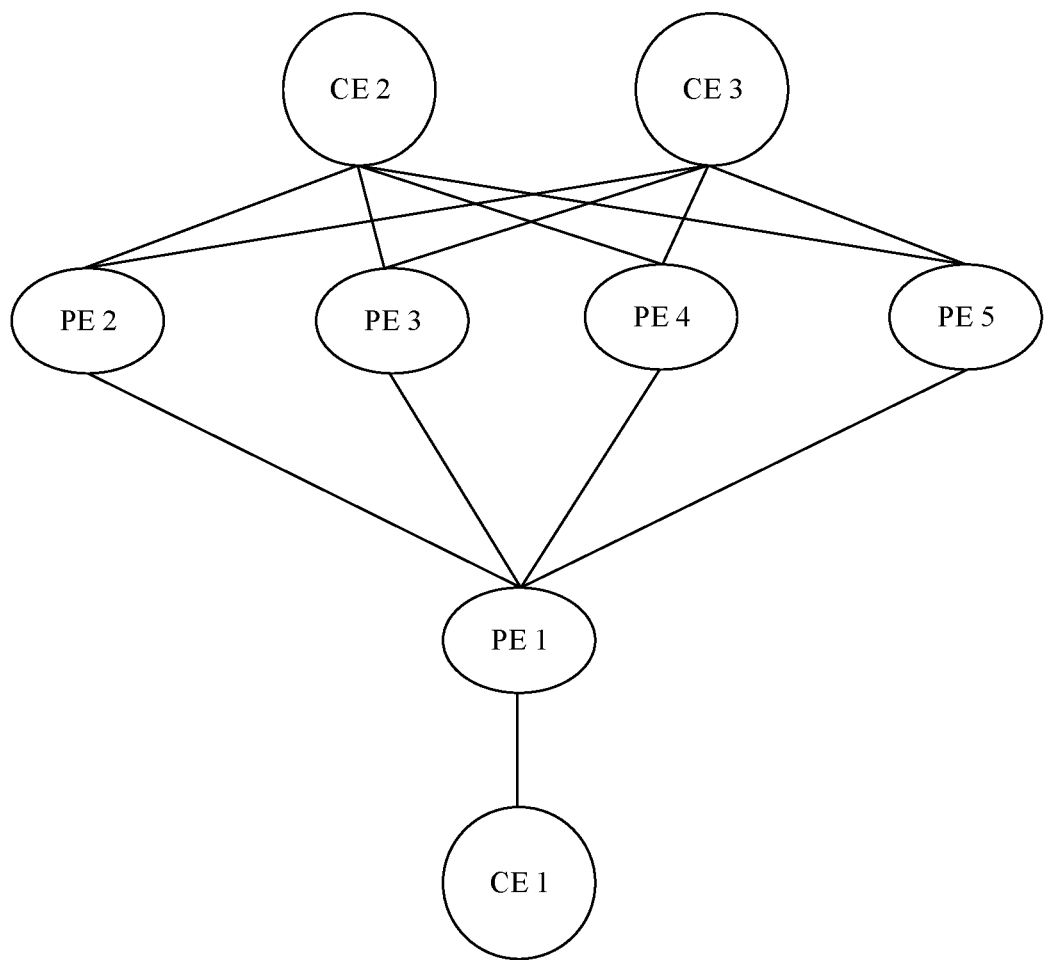
FIG. 4 is a schematic diagram of a structure of another network system according to an embodiment of this application.

In an embodiment, FIG. 4 is a schematic diagram of a structure of another network system according to an embodiment of this application. As shown in FIG. 4, a CE 1 is connected to a PE 1, the PE 1 is separately connected to a PE 2, a PE 3, a PE 4, and a PE 5, and the PE 2, the PE 3, the PE 4, and the PE 5 each are connected to a CE 2 and a CE 3. The CE 1 is the second network device. The PE 1 is the first network device. The PE 2, the PE 3, the PE 4, and the PE 5 are the plurality of network devices connected to the first network device. The CE 2 and the CE 3 are the target network devices. The CE 1 may establish an EVPN VPWS with a virtual machine device, and the virtual machine device includes the CE 2 and the CE 3. In actual application, the PE 1 may classify the PE 2, the PE 3, the PE 4, and the PE 5 into two to four groups according to an actual requirement, and a PE in each group is connected to two same customer-side network devices, namely, the CE 2 and the CE 3.

Figure 5:
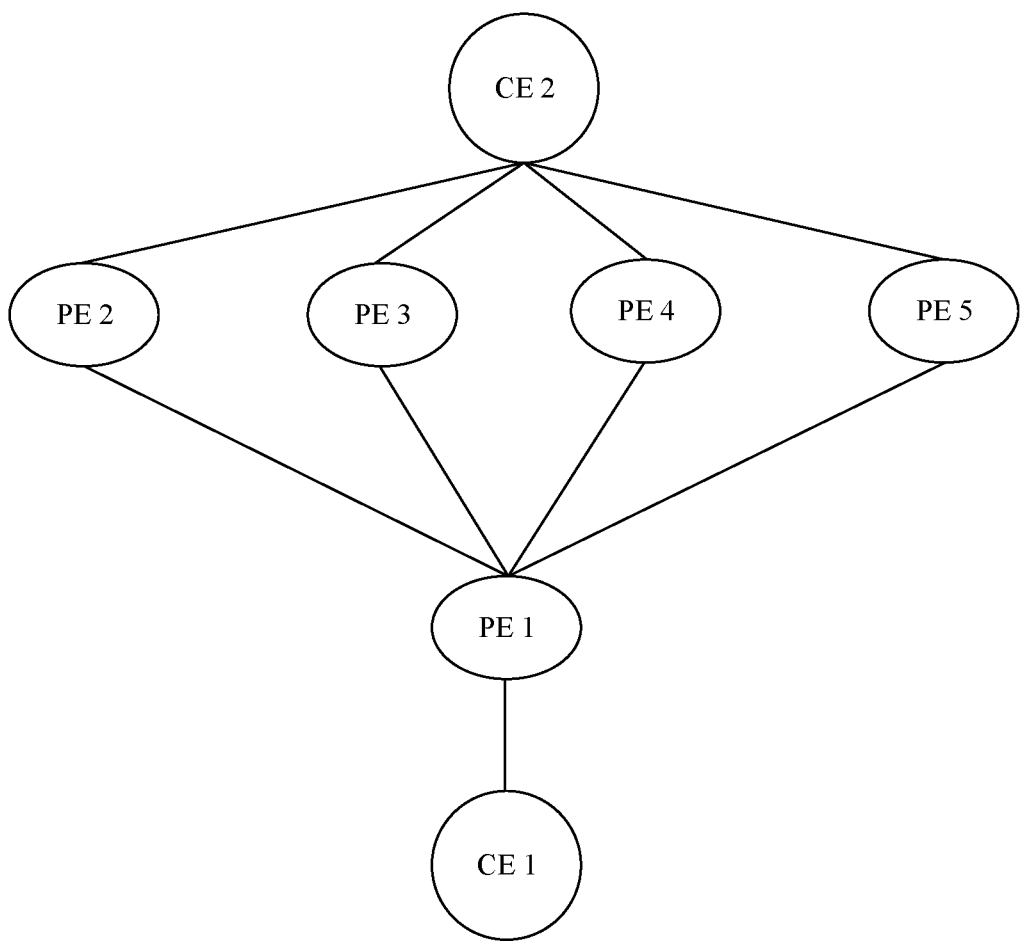
FIG. 5 is a schematic diagram of a structure of another network system according to an embodiment of this application.

In an embodiment, FIG. 5 is a schematic diagram of a structure of another network system according to an embodiment of this application. As shown in FIG. 5, a CE 1 is connected to a PE 1, the PE 1 is separately connected to a PE 2, a PE 3, a PE 4, and a PE 5, and the PE 2, the PE 3, the PE 4, and the PE 5 each are connected to a CE 2. The CE 1 is the second network device. The PE 1 is the first network device. The PE 2, the PE 3, the PE 4, and the PE 5 are the plurality of network devices connected to the first network device. The CE 2 is the target network device. The CE 1 may establish an EVPN VPWS with the CE 2. In actual application, the PE 1 may classify the PE 2, the PE 3, the PE 4, and the PE 5 into two to four groups according to an actual requirement, and a PE in each group is connected to a same customer-side network device, namely, the CE 2.

The foregoing describes the scenarios to which the packet processing method provided in this embodiment of this application is applied. The following describes in detail, with reference to accompanying drawings, a process in which a first network device classifies a plurality of network devices connected to the first network device into groups.

In an embodiment, before the first network device determines one or more groups in a plurality of groups based on an obtained inter-group forwarding mode, the first network device obtains a configuration instruction, where the configuration instruction is used to indicate a plurality of modes corresponding to the plurality of groups. The first network device obtains the inter-group forwarding mode based on the plurality of modes corresponding to the plurality of groups.

The first network device obtains the configuration instruction from information configured by operation and maintenance personnel on the first network device. For example, the operation and maintenance personnel configure a group on the first network device through a command line or in another indication manner, so that the first network device obtains the corresponding configuration instruction. Alternatively, the first network device obtains the configuration instruction by receiving configuration information sent by another network device. For example, a controller sends the configuration information to the first network device for group configuration, so that the first network device obtains the corresponding configuration instruction.

The scenario shown in FIG. 3 is used as an example. The first network device classifies, according to the obtained configuration instruction, the PE 2 and the PE 3 into one group, and the PE 1 classifies the PE 4 and the PE 5 into another group. In addition, the first network device also classifies, according to the configuration instruction, the group in which the PE 2 and the PE 3 are located as an active group and the group in which the PE 4 and the PE 5 are located as a standby group.

In an embodiment, in the configuration instruction, each of the plurality of groups may be represented by using a group identifier, that is, each of the plurality of groups has a corresponding group identifier. For example, the group identifier may be a service identifier (service-id). Network devices in each group each include a VPWS instance, and VPWS instances included in the network devices in a same group each are deployed with a same service-id.

In an embodiment, in the scenario shown in FIG. 3, the operation and maintenance personnel may configure a group on the PE 1 through a command line. The configuration instruction obtained by the PE 1 may be as follows:

local-service-id 100 remote-service-id 200 primary
(local service identifier 100, remote service identifier 200, active)
local-service-id 100 remote-service-id 300 backup
(local service identifier 100, remote service identifier 300, standby)

A VPWS service is deployed on the PE 1. A connection between the PE 1 and the CE 1 may have a corresponding service-id, and the local-service-id is 100. A same service-id is deployed for both the PE 2 and the PE 3, and the service-id is 200. A same service-id is deployed for both the PE 4 and the PE 5, and the service-id is 300. For the PE 1, a service-id corresponding to the connection between the PE 1 and the CE 1 is the local-service-id, and service-ids deployed for all the PE 2, the PE 3, the PE 4, and the PE 5 are remote-service-ids.

In addition, a connection between the PE 2 and the CE 2 and a connection between the PE 3 and CE 2 are identified by using a same Ethernet segment identifier (ESI), to indicate that a link between the PE 2 and the CE 2 and a link between the PE 3 and the CE 2 belong to a same Ethernet segment (ES). A connection between the PE 4 and the CE 3 and a connection between the PE 5 and the CE 3 are identified by using a same ESI, to indicate that a link between the PE 4 and the CE 3 and a link between the PE 5 and the CE 3 belong to a same ES. For example, the ESI corresponding to the connection between the PE 2 and the CE 2 and the connection between the PE 3 and CE 2 is an ESI-1, and the ESI corresponding to the connection between the PE 4 and the CE 3 and the connection between the PE 5 and the CE 3 is an ESI-2. Generally, when a site is connected to a plurality of PEs through different Ethernet links to access an EVPN network, the links form one ES and are identified by using a same ESI identifier to indicate that the links belong to the same ES.

Figure 6:
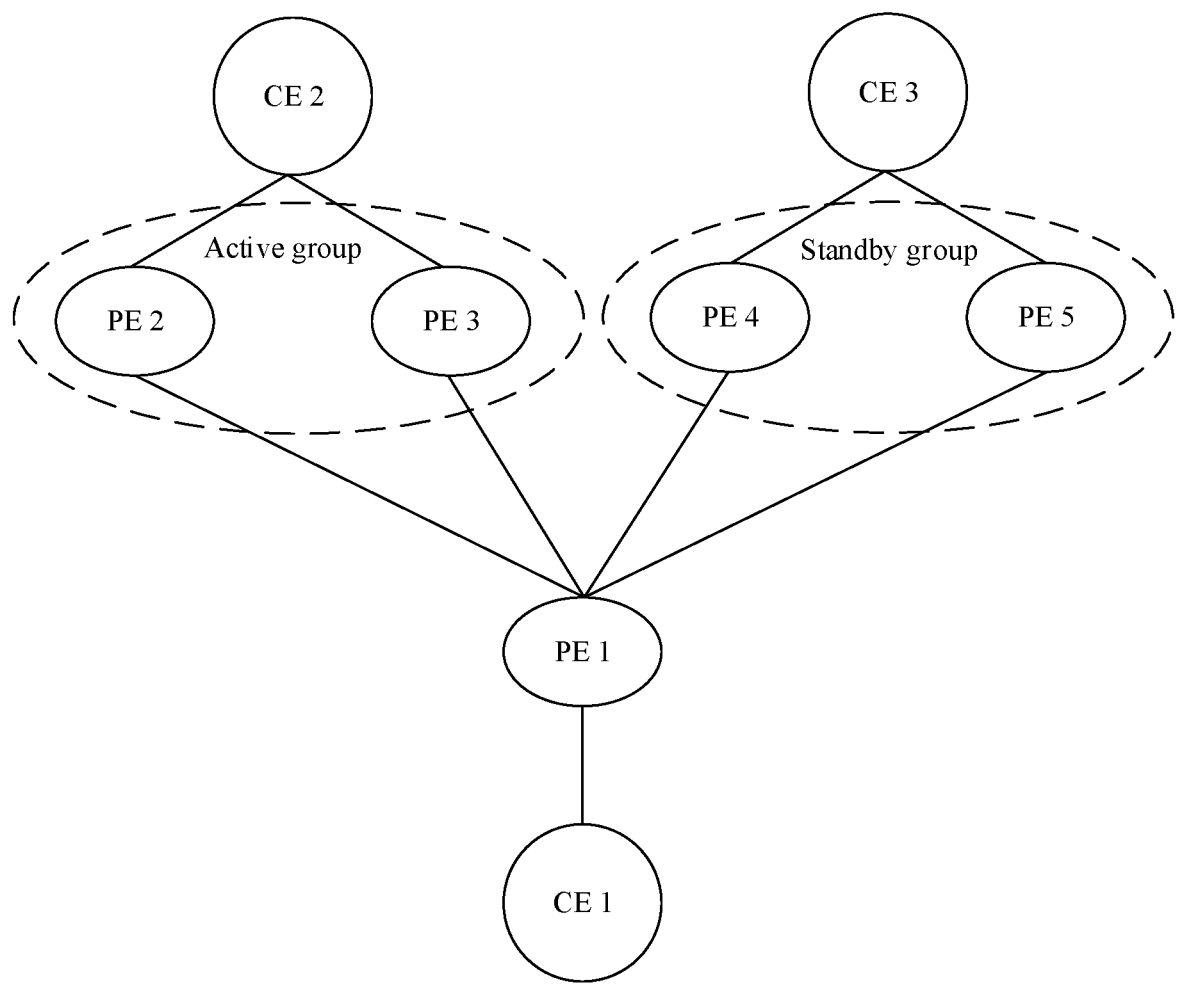
FIG. 6 is a schematic diagram of a structure of a network system for which group classification is performed according to an embodiment of this application.

Therefore, when the PE 1 obtains the configuration instruction, the PE 1 may determine to classify the PE 2 and the PE 3 that are deployed with the remote-service-id 200 into the active group, and classify the PE 4 and the PE 5 that are deployed with the remote-service-id 300 into the standby group. FIG. 6 is a schematic diagram of a structure of a network system for which group classification is performed according to an embodiment of this application. As shown in FIG. 6, a PE 2 and a PE 3 that are connected to a CE 2 are classified into an active group, and a PE 4 and a PE 5 that are connected to a CE 3 are classified into a standby group. The CE 2 and the CE 3 are used to carry an EVPN VPWS between the CE 2 and a PE 1 and between the CE 3 and the PE 1, and the CE 2 and the CE 3 are different devices. Therefore, the PEs connected to the CE 2 are classified into one group, and the PEs connected to the CE 3 are classified into another group. When forwarding a packet of the service, the PE 1 can preferably select the PE 2 or the PE 3 to forward the packet of the service to the CE 2. After the active group in which the PE 2 and the PE 3 are located is unavailable, the PE 1 uses the PE 4 or the PE 5 to forward the packet of the service to the CE 3. In this way, the CE 2 and the CE 3 form a resource pool. In normal cases, a CE 1 accesses the active CE 2 in the resource pool. When the CE 1 cannot access the CE 2, the CE 1 accesses the other CE in the resource pool.

The active group in which the PE 2 and the PE 3 are located and the standby group in which the PE 4 and the PE 5 are located may further have corresponding intra-group forwarding modes. For example, when the intra-group forwarding mode corresponding to the active group is an active/standby mode, the PE 2 is an active device, and the PE 3 is a standby device, when the PE 1 determines to forward the packet of the service by using the active group, the PE 1 preferably forwards the packet of the service to the PE 2, or forwards the packet of the service to the PE 3 when the PE 2 is unavailable. For another example, when the intra-group forwarding mode corresponding to the active group is an all-active mode, when the PE 1 determines to forward the packet of the service by using the active group, the PE 1 may randomly select either of the PE 2 and the PE 3 to forward the packet of the service.

For example, when the intra-group forwarding mode corresponding to the active group in which the PE 2 and the PE 3 are located is configured as the all-active mode, a configuration instruction may be as follows:

ESI 0001.0001.0001.0001.0000
EVPN redundancy-mode all-active
0001.0001.0001.0001.0000 indicates an ESI corresponding to a connection between the PE 2 and the CE 2 and a connection between the PE 3 and the CE 2, EVPN redundancy-mode indicates an EVPN redundancy mode, and all-active indicates the all-active mode. The intra-group forwarding mode corresponding to the PE 2 and the PE 3 may be configured as the all-active mode through the foregoing configuration.

Figure 7:
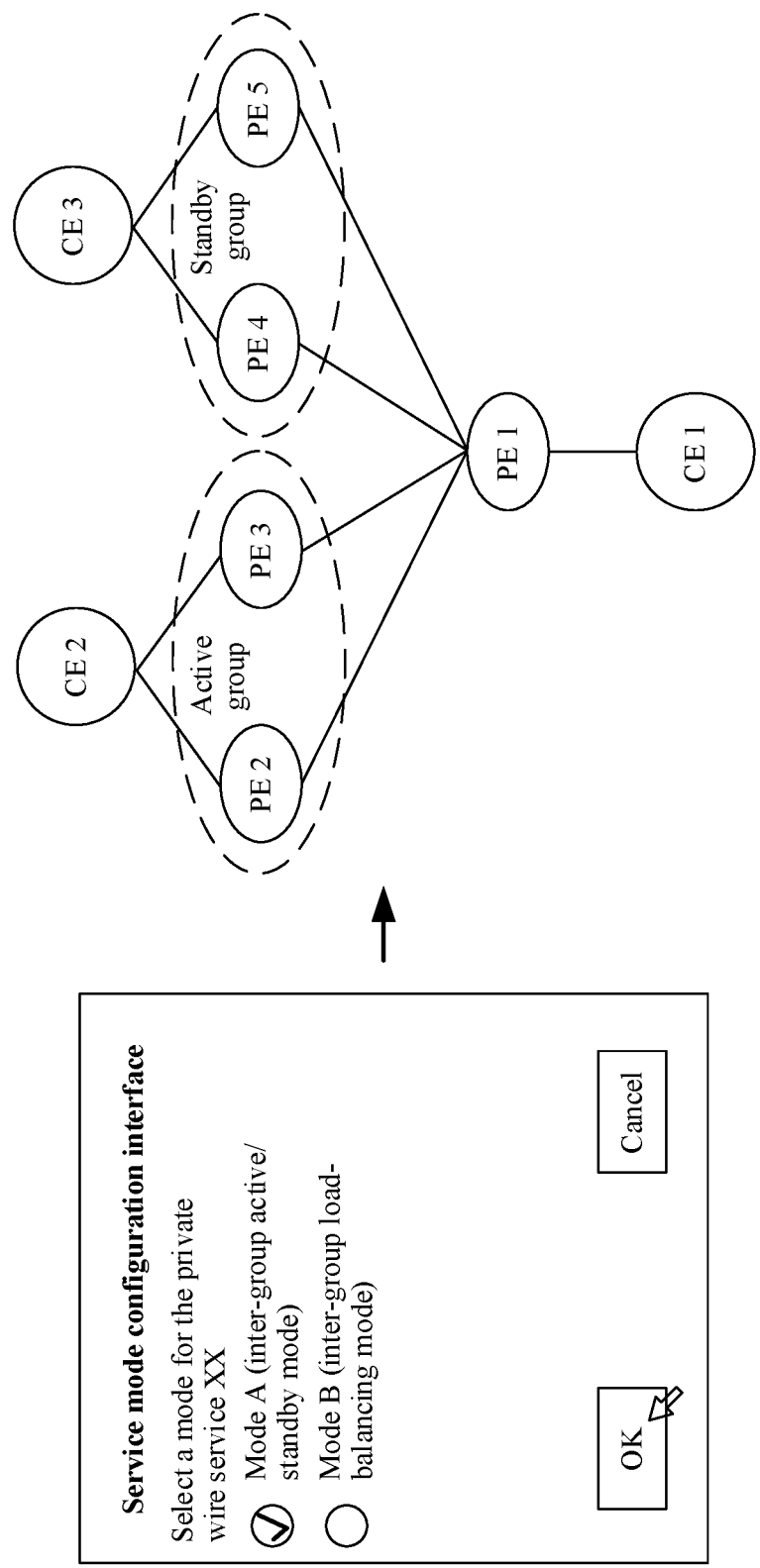
FIG. 7 is a schematic diagram of group classification based on a configuration mode according to an embodiment of this application.

In an embodiment, in the scenario shown in FIG. 3, the operation and maintenance personnel or a user may indicate, in a control interface, a service mode that needs to be configured by the PE 1, to configure a group. The PE 1 may correspond to a plurality of different service modes, and the different service modes may include, for example, an inter-group active/standby mode and an inter-group load-balancing mode. The PE 1 can perform corresponding group classification based on a service mode indicated in the configuration instruction. FIG. 7 is a schematic diagram of group classification based on a configuration mode according to an embodiment of this application. As shown in FIG. 7, a user or operation and maintenance personnel may select a corresponding service mode in a service mode configuration interface on a controller. The service mode includes a mode A and a mode B. The mode A corresponds to an inter-group active/standby mode, and the mode B corresponds to an inter-group load-balancing mode. After the user or the operation and maintenance personnel determine to select the configuration mode A, the controller generates a corresponding configuration instruction, and sends the configuration instruction to a PE 1, where the configuration instruction indicates, to the PE 1, that a service mode to be configured is the service mode A. Then, after receiving the configuration instruction, the PE 1 classifies a PE 2 and a PE 3 that are connected to a CE 2 into an active group, and classifies a PE 4 and a PE 5 that are connected to a CE 3 into a standby group.

In addition, in the scenario shown in FIG. 3, the PE 2, the PE 3, the PE 4, and the PE 5 may be classified into the active group and the standby group, and the PE 2, the PE 3, the PE 4, and the PE 5 may alternatively be classified into an active group and a load-balancing group. Specifically, the configuration instruction obtained by the PE 1 may further be as follows:

local-service-id 100 remote-service-id 200 primary
(local service identifier 100, remote service identifier 200, active)
local-service-id 100 remote-service-id 300 load-balancing
(local service identifier 100, remote service identifier 300, load-balancing)

Figure 8:
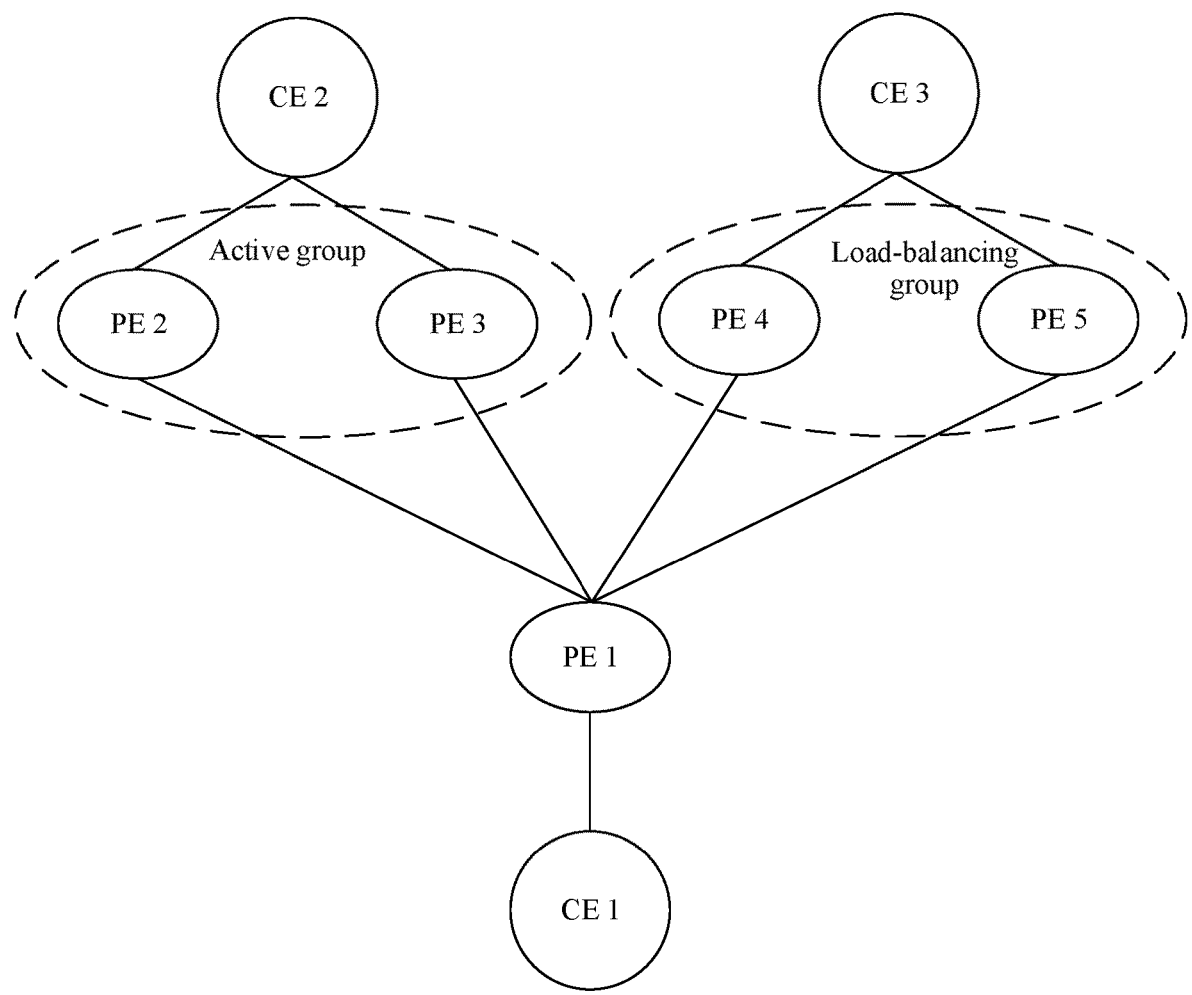
FIG. 8 is a schematic diagram of a structure of a network system for which group classification is performed according to an embodiment of this application.

When the PE 1 obtains the configuration instruction, the PE 1 may determine to classify the PE 2 and the PE 3 that are deployed with the remote-service-id 200 into the active group, and classify the PE 4 and the PE 5 that are deployed with the remote-service-id 300 into the load-balancing group. In this way, when the PE 1 forwards a packet of a service, the PE 1 may select either of the active group or the load-balancing group according to a load balancing policy to forward the packet of the service. Specifically, FIG. 8 is a schematic diagram of a structure of a network system for which group classification is performed according to an embodiment of this application. As shown in FIG. 8, a PE 2 and a PE 3 that are connected to a CE 2 are classified into an active group, and a PE 4 and a PE 5 that are connected to a CE 3 are classified into a load-balancing group.

In an embodiment, based on the scenario corresponding to FIG. 3, a PE 1 is also connected to a PE 6 and a PE 7, and the PE 6 and the PE 7 are connected to the CE 3. In this scenario, the PE 2, the PE 3, the PE 4, the PE 5, the PE 6, and the PE 7 may further be classified into an active group and a plurality of standby groups. Specifically, a configuration instruction obtained by the PE 1 may be as follows:

local-service-id 100 remote-service-id 200 primary
(local service identifier 100, remote service identifier 200, active)
local-service-id 100 remote-service-id 300 backup priority 1
(local service identifier 100, remote service identifier 300, standby priority 1)
local-service-id 100 remote-service-id 300 backup priority 2
(local service identifier 100, remote service identifier 400, standby priority 2)

A same service-id is deployed for both the PE 6 and the PE 7, and the service-id is 400. When the PE 1 obtains the configuration instruction, the PE 1 may determine to classify the PE 2 and the PE 3 that are deployed with the remote-service-id 200 into the active group. The PE 1 classifies the PE 4 and the PE 5 that are deployed with the remote-service-id 300 into a standby group 1, and the standby group 1 has a priority of 1. The PE 1 classifies the PE 6 and the PE 6 that are deployed with the remote-service-id 400 into a standby group 2, and the standby group 2 has a priority of 2. The priority of the standby group 1 is higher than that of the standby group 2.

Figure 9:
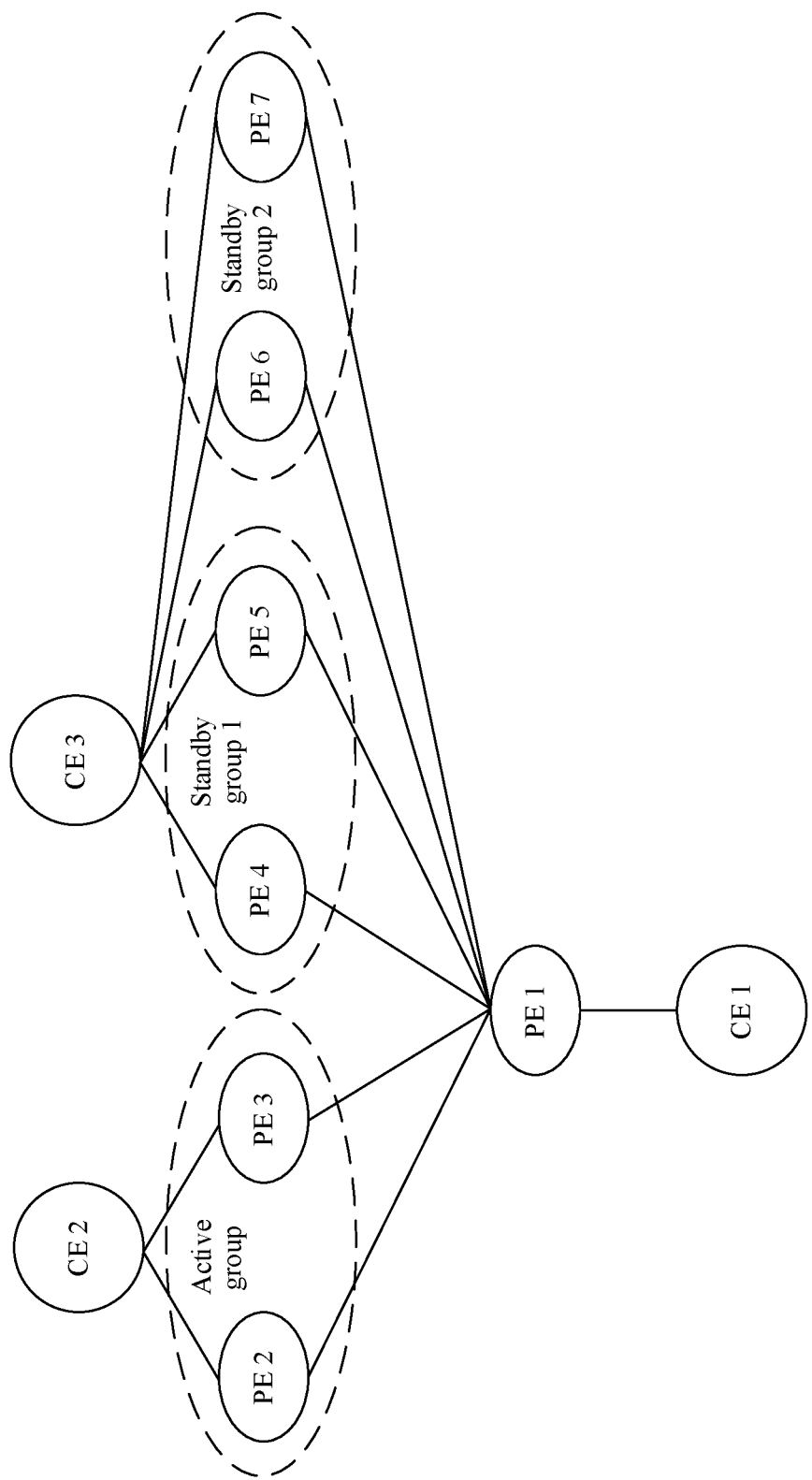
FIG. 9 is a schematic diagram of a structure of another network system for which group classification is performed according to an embodiment of this application.

FIG. 9 is a schematic diagram of a structure of another network system for which group classification is performed according to an embodiment of this application. As shown in FIG. 9, a PE 2 and a PE 3 that are connected to a CE 2 are classified into an active group, a PE 4 and a PE 5 that are connected to a CE 3 are classified into a standby group 1, and a PE 6 and a PE 7 that are connected to the CE 3 are classified into a standby group 2. When forwarding a packet of a service, a PE 1 preferably selects the PE 2 or the PE 3 in the active group to forward the packet of the service to the CE 2. When the active group in which the PE 2 and the PE 3 are located is unavailable, the PE 1 selects the PE 4 or the PE 5 in the standby group 1 with a higher priority to forward the packet of the service to the CE 3. When the standby group 1 in which the PE 4 and the PE 5 are located is unavailable, the PE 1 selects the PE 6 or the PE 7 in the standby group 2 to forward the packet of the service to the CE 3.

It may be understood that, the foregoing embodiments use an example in which the CE 1 sends the packet to a CE that establishes an EVPN VPWS with the CE 1 to describe a process in which the PE 1 connected to the CE 1 performs group classification. In actual application, the CE that establishes the EVPN VPWS with the CE 1 may also establish an EVPN VPWS with a device on a CE 1 side. Therefore, a PE connected to the CE that establishes the EVPN VPWS with the CE 1 can also perform group classification.

Figure 10:
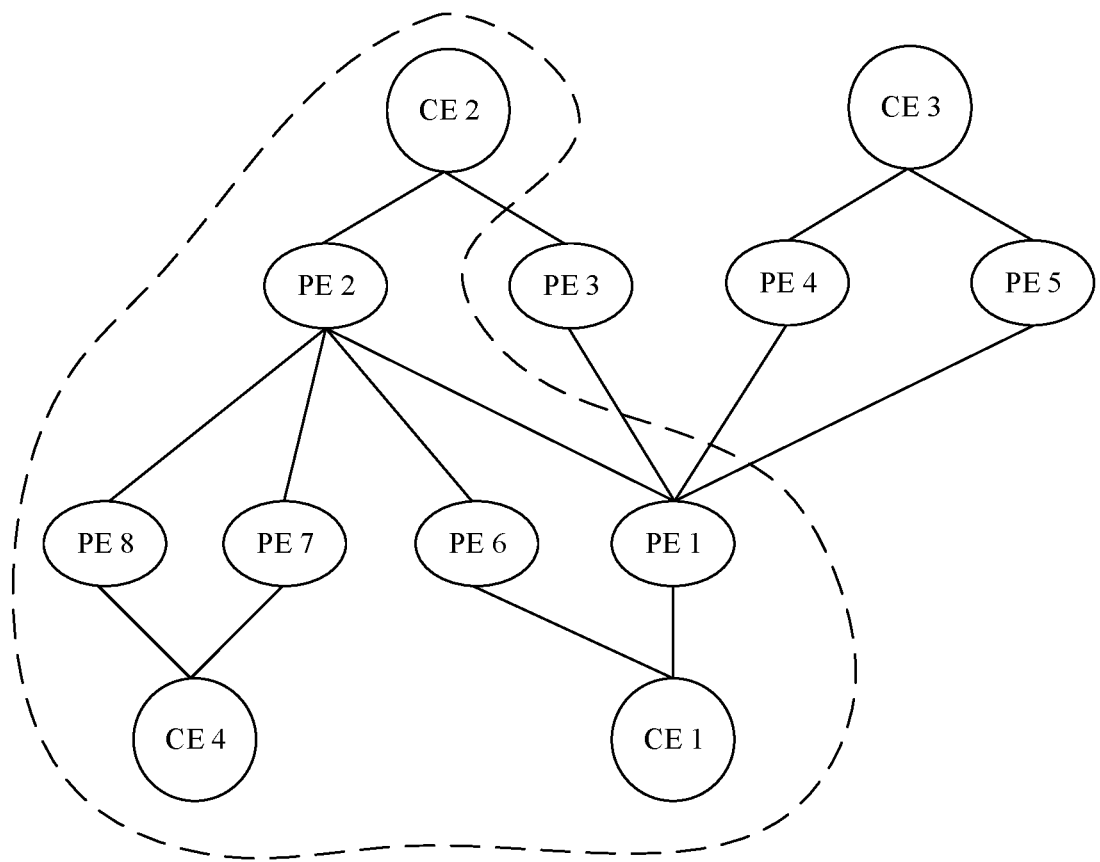
FIG. 10 is a schematic diagram of a structure of a network system according to an embodiment of this application.

FIG. 10 is a schematic diagram of a structure of a network system according to an embodiment of this application. As shown in FIG. 10, in a dashed box, a CE 2 is connected to a PE 2, the PE 2 is connected to a PE 1, a PE 6, a PE 7, and a PE 8, the PE 1 and the PE 6 are connected to a CE 1, and the PE 7 and the PE 8 are connected to a CE 4. The CE 2 may establish an EVPN VPWS with a virtual machine device, and the virtual machine device includes the CE 1 and the CE 4, that is, the EVPN VPWS is established between the CE 2 and the CE 1 and between the CE 2 and the CE 4. In actual application, the PE 2 connected to the CE 2 may obtain a configuration instruction, classify the PE 1, the PE 6, the PE 7, and the PE 8 into a plurality of groups, and forward, based on the groups obtained through classification, packets of the service that are received from the CE 2.

The foregoing embodiments use the example in which the first network device is a network device in the EVPN network to describe the scenarios to which the packet processing method provided in the embodiments of this application is applied. It may be understood that the packet processing method provided in the embodiments of this application may also be applied to another network scenario. A network scenario to which the embodiments of this application are applied is not uniquely limited herein.

Figure 11:
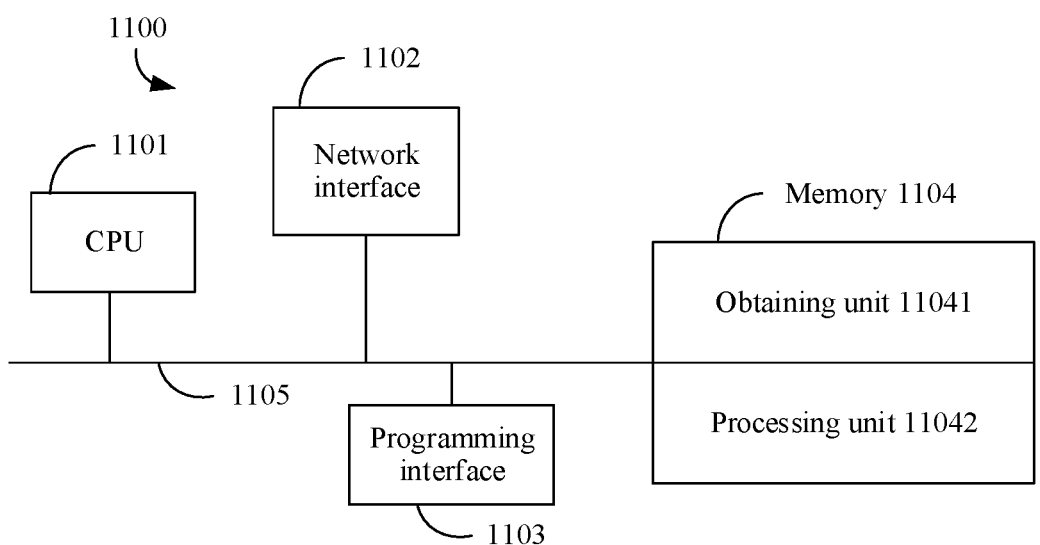
FIG. 11 is a schematic diagram of a structure of a network device 1100 according to an embodiment of this application.

To implement the foregoing embodiments, this application further provides a network device. FIG. 11 is a schematic diagram of a structure of a network device 1100 according to an embodiment of this application.

Although the network device 1100 shown in FIG. 11 shows some specific features, a person skilled in the art may be aware from the embodiments of this application that, for brevity, FIG. 11 does not show various other features, to avoid confusing more related aspects of the implementations disclosed in the embodiments of this application. For this purpose, as an example, in some implementations, the network device 1100 includes one or more processing units (CPU) 1101, a network interface 1102, a programming interface 1103, a memory 1104, and one or more communications buses 1105 that are configured to interconnect various components. In some other implementations, some functional components or units may be omitted or added to the network device 1100 based on the foregoing example.

In some embodiments, in addition to another purpose, the network interface 1102 is configured to connect to one or more other network devices/servers in a network system. In some implementations, the communications bus 1105 includes a circuit that interconnects system components and controls communication between the system components. The memory 1104 may include a non-volatile memory, for example, a read-only memory (ROM), a programmable read-only memory (PROM), an erasable programmable read-only memory (EPROM), an electrically erasable programmable read-only memory (EEPROM), or a flash memory. The memory 1104 may also include a volatile memory. The volatile memory may be a random access memory (RAM), and is used as an external cache.

In some implementations, a non-transitory computer-readable storage medium of the memory 1104 or the memory 1104 stores the following programs, modules, and data structures, or a subset thereof, and for example, includes a transceiver unit (not shown in the figure), an obtaining unit 11041, and a processing unit 11042.

In an embodiment, the network device 1100 may have any function of the first network device in the first network device in the method embodiment corresponding to FIG. 2.

It may be understood that the network device 1100 may correspond to the first network device in the foregoing method embodiment. Modules, and the foregoing other operations and/or functions in the network device 1100 are separately used to implement various operations and methods implemented by the first network device in the method embodiment. For details, refer to the method embodiment corresponding to FIG. 2. For brevity, details are not described herein again.

It should be understood that the foregoing function of the transceiver unit may be implemented by the processor by invoking program code in the memory, and cooperation with the network interface 1102 is performed as required. Alternatively, a data receiving/sending operation may be completed by the network interface 1102 on the network device 1100.

In various embodiments, the network device 1100 is configured to perform the packet processing method provided in the embodiments of this application, for example, perform the packet processing method corresponding to the embodiment shown in FIG. 2.

Corresponding to the method embodiment and the virtual apparatus embodiment provided in this application, an embodiment of this application further provides a network device. The following describes a hardware structure of the network device.

Figure 12:
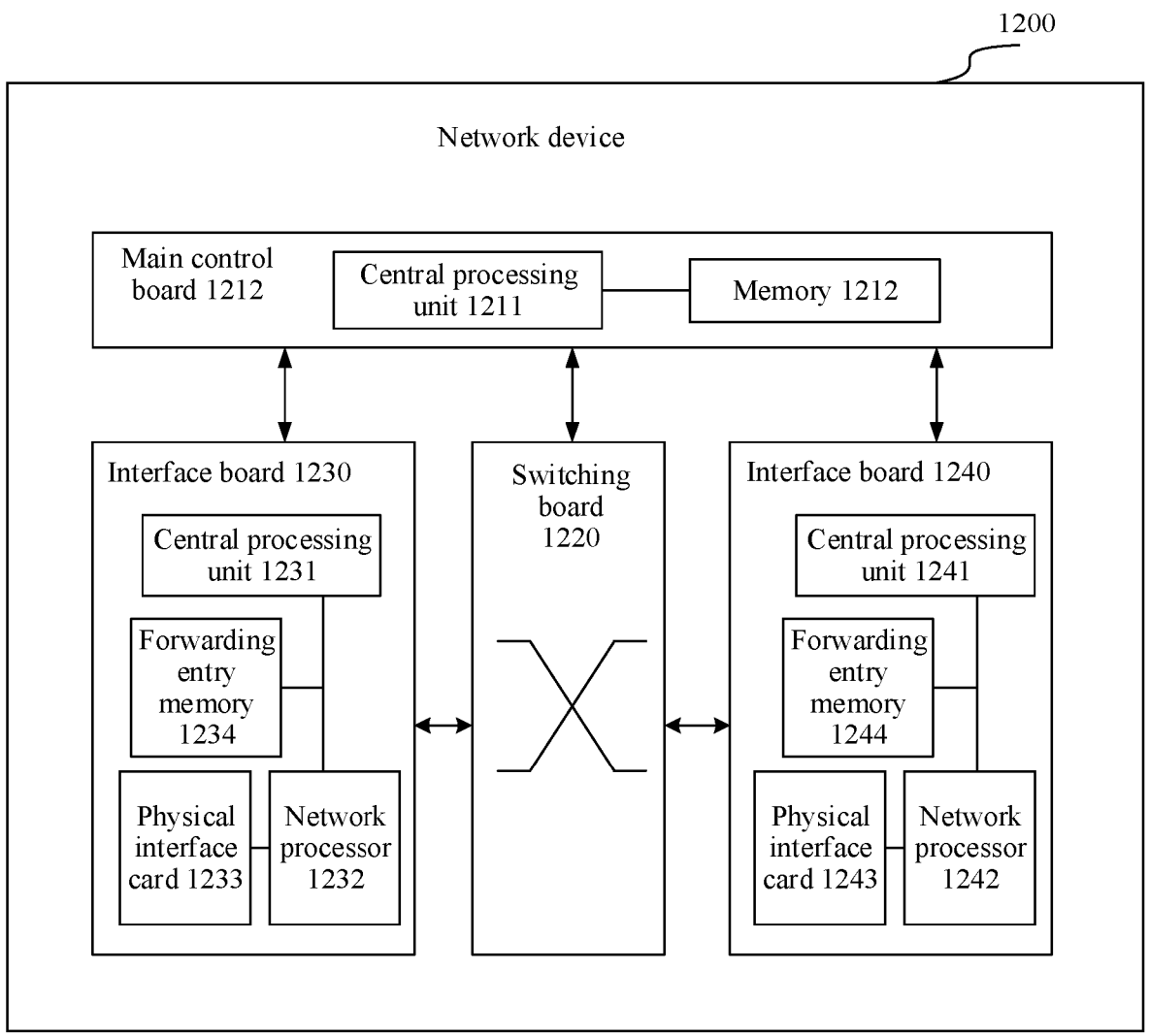
FIG. 12 is a schematic diagram of a structure of a network device 1200 according to an embodiment of this application.

FIG. 12 is a schematic diagram of a structure of a network device 1200 according to an embodiment of this application. The network device 1200 may be configured as the first network device in the foregoing method embodiments.

The network device 1200 may correspond to the first network device in the foregoing method embodiments. Hardware, modules, and the foregoing other operations and/or functions in the network device 1200 are separately used to implement various operations and methods implemented by the first network device in the method embodiments. For specific details of a detailed procedure about how the network device 1200 forwards a packet, refer to the foregoing method embodiments. For brevity, details are not described herein again. Operations in the foregoing method embodiment in FIG. 2 can be implemented by using a hardware integrated logic circuit in the processor in the network device 1200, or by using an instruction in a form of software. Operations of the methods disclosed with reference to the embodiments of this application may be directly executed and accomplished by using a hardware processor, or may be executed and accomplished by using a combination of hardware and software modules in the processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the operations in the foregoing methods in combination with hardware of the processor. To avoid repetition, details are not described herein again.

The network device 1200 may also correspond to the network device 1100 in the foregoing virtual apparatus embodiment, and each functional module in the network device 1100 is implemented by using software and hardware of the network device 1200. In a possible implementation, the functional modules included in the network device 1100 are generated after a processor of the network device 1200 reads program code stored in the memory, or are jointly implemented by the processor of a network device 1200 reads program code stored in the memory and cooperates with a communications interface.

The network device 1200 includes a main control board 1212 and an interface board 1230.

The main control board 1212 is also referred to as a main processing unit (MPU) or a route processor card. The main control board 1212 controls and manages components in the network device 1200, including route computation, device management, device maintenance, and protocol processing functions. The main control board 1212 includes a central processing unit 1211 and a memory 1212.

The interface board 1230 is also referred to as a line processing unit (LPU), a line card, or a service board. The interface board 1230 is configured to provide various service interfaces, and forward a data packet. The service interfaces include but are not limited to an Ethernet interface, a POS (Packet over SONET/SDH) interface, and the like. The Ethernet interface is, for example, a flexible Ethernet service interface (FlexE Client). The interface board 1230 includes a central processing unit 1231, a network processor 1232, a forwarding entry memory 1234, and a physical interface card (PIC) 1233.

The central processing unit 1231 on the interface board 1230 is configured to control and manage the interface board 1230, and communicate with the central processing unit 1211 on the main control board 1212.

The network processor 1232 is configured to implement packet forwarding processing. A form of the network processor 1232 may be a forwarding chip. Specifically, processing of an uplink packet includes processing of an inbound interface of the packet and forwarding table searching, processing of a downlink packet includes forwarding table searching, and the like.

The physical interface card 1233 is configured to implement an interconnection function at a physical layer. Original traffic enters the interface board 1230 from the physical interface card, and a processed packet is sent from the physical interface card 1233. The physical interface card 1233 includes at least one physical interface. The physical interface is also referred to as a physical port. The physical interface card 1233 corresponds to a FlexE physical interface in a system architecture. The physical interface card 1233, also referred to as a subcard, may be installed on the interface board 1230, and is responsible for converting an optical/electrical signal into a packet, performing validity check on the packet, and forwarding the packet to the network processor 1232 for processing. In some embodiments, the central processing unit 1231 on the interface board 1203 may also perform a function of the network processor 1232, for example, implement software forwarding based on a general-purpose CPU. In this case, the network processor 1232 is not required in the physical interface card 1233.

In an embodiment, the network device 1200 includes a plurality of interface boards. For example, the network device 1200 further includes an interface board 1240. The interface board 1240 includes a central processing unit 1241, a network processor 1242, a forwarding entry memory 1244, and a physical interface card 1243.

Optionally, the network device 1200 further includes a switching board 1220. The switching board 1220 may also be referred to as a switch fabric unit (SFU). When the network device has the plurality of interface boards 1230, the switching board 1220 is configured to complete data exchange between the interface boards. For example, the interface board 1230 and the interface board 1240 may communicate with each other by using the switching board 1220.

The main control board 1212 and the interface board 1230 are coupled. For example, the main control board 1212, the interface board 1230 and the interface board 1240, and the switching board 1220 are connected to a system backplane through a system bus to implement interworking. In a possible implementation, an inter-process communication (IPC) channel is established between the main control board 1212 and the interface board 1230, and the main control board 1212 and the interface board 1230 communicate with each other through the IPC channel.

Logically, the network device 1200 includes a control plane and a forwarding plane. The control plane includes the main control board 1212 and the central processing unit 1231. The forwarding plane includes components used for forwarding, for example, the forwarding entry memory 1234, the physical interface card 1233, and the network processor 1232. The control plane performs functions such as a function of a router, generating a forwarding table, processing signaling and protocol packets, and configuring and maintaining a status of a device. The control plane delivers the generated forwarding table to the forwarding plane. On the forwarding plane, the network processor 1232 searches the forwarding table delivered by the control plane to forward a packet received by the physical interface card 1233. The forwarding table delivered by the control plane may be stored in the forwarding entry memory 1234. In some embodiments, the control plane and the forwarding plane may be totally separated, and are not on a same device.

It should be understood that the transceiver unit in the network device 1100 may be equivalent to the physical interface card 1233 or the physical interface card 1243 in the network device 1200. The obtaining unit 11041 and the processing unit 11042 in the network device 1100 may be equivalent to the central processing unit 1211 or the central processing unit 1231 in the network device 1200.

It should be understood that an operation performed on the interface board 1240 is consistent with an operation performed on the interface board 1230 in this embodiment of this application. For brevity, details are not described. It should be understood that the network device 1200 in this embodiment may correspond to the first network device in the foregoing method embodiments. The main control board 1212, the interface board 1230, and/or the interface board 1240 in the network device 1200 may implement functions and/or various operations performed by the first network device in the foregoing method embodiments. For brevity, details are not described herein again.

It should be noted that, there may be one or more main control boards. When there are a plurality of main control boards, the main control boards may include an active main control board and a standby main control board. There may be one or more interface boards, and a network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the network device may not need the switching board, and the interface board provides a function of processing service data of an entire system. In a distributed forwarding architecture, the network device may have at least one switching board, and data exchange between a plurality of interface boards is implemented by using the switching board, to provide a large-capacity data exchange and processing capability. Therefore, a data access and processing capability of a network device in the distributed architecture is better than that of a device in the centralized architecture. Optionally, the network device may alternatively be in a form in which there is only one card. To be specific, there is no switching board, and functions of the interface board and the main control board are integrated on the card. In this case, the central processing unit on the interface board and the central processing unit on the main control board may be combined into one central processing unit on the card, to perform functions obtained after the two central processing units are combined. The device in this form (for example, a network device such as a low-end switch or router) has a relatively weak data exchange and processing capability. Which architecture is specifically used depends on a specific networking deployment scenario, and is not uniquely limited herein.

In some embodiments, the first network device may be implemented as a virtualized device. For example, the virtualized device may be a virtual machine (VM) on which a program having a packet sending function runs, and the virtual machine is deployed on a hardware device (for example, a physical server). The virtual machine is a complete computer system that is simulated by software, that has a complete hardware system function, and that runs in a totally isolated environment. The virtual machine may be configured as a first network device. For example, the first network device may be implemented based on a general-purpose physical server in combination with a network functions virtualization (NFV) technology. The first network device is a virtual host, a virtual router, or a virtual switch. After reading this application, with reference to the NFV technology, a person skilled in the art may virtualize, on the general physical server, the first network devices having the foregoing functions. Details are not described herein again.

It should be understood that the network devices in the foregoing product forms separately have any function of the first network device in the foregoing method embodiments, and details are not described herein.

An embodiment of this application provides a computer program product. When the computer program product runs on a network device, the network device is enabled to perform the method performed by the first network device in the method embodiment corresponding to FIG. 2.

Figure 13:
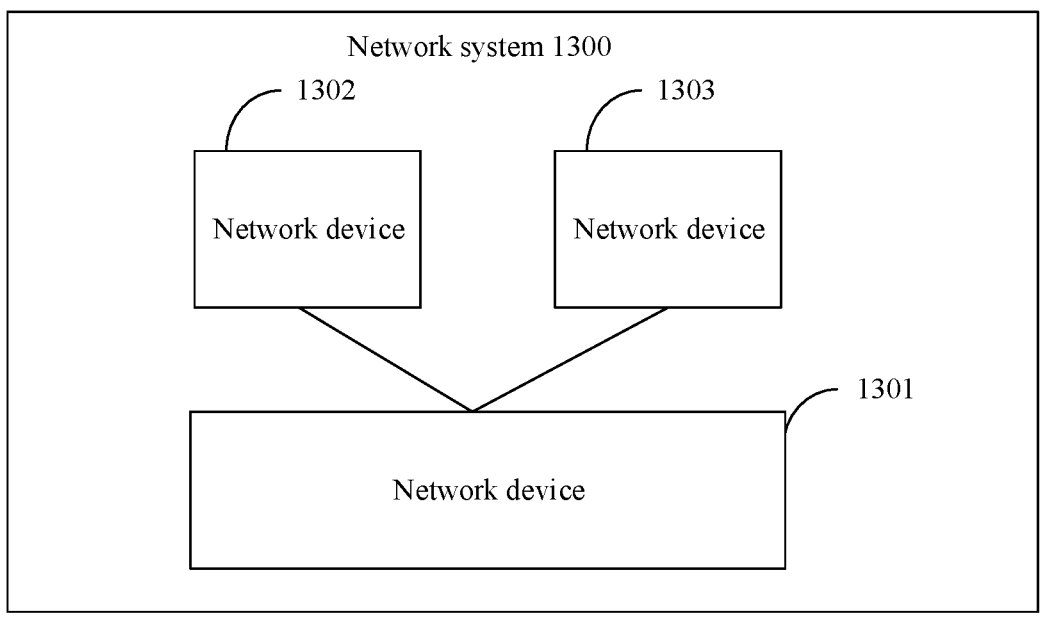
FIG. 13 is a schematic diagram of a structure of a network system 1300 according to an embodiment of this application.

FIG. 13 shows a network system 1300 provided in an embodiment of this application. The system 1300 includes a network device 1301, a network device 1302, and a network device 1303. The network device 1301 is separately connected to the network device 1302 and the network device 1303. Optionally, the network device 1301 may be the first network device in the method embodiment corresponding to FIG. 2.

An embodiment of this application further provides a chip, including a processor and an interface circuit. The interface circuit is configured to receive an instruction and transmit the instruction to the processor. The processor is coupled to a memory, the memory is configured to store programs or instructions, and when the programs or the instructions are executed by the processor, the chip system is enabled to implement the method in any one of the foregoing method embodiments.

In an embodiment, there may be one or more processors in the chip system. The processor may be implemented by using hardware, or may be implemented by using hardware. When the processor is implemented by using the hardware, the processor may be a logic circuit, an integrated circuit, or the like. When the processor is implemented by using the software, the processor may be a general-purpose processor, and is implemented by reading software code stored in the memory.

In an embodiment, there may be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not limited in this application.

For example, the chip system may be a field programmable gate array (FPGA), an application-specific integrated chip (ASIC), a system on chip (SoC), a central processing unit (CPU), a network processor (NP), a digital signal processor (DSP), a micro controller unit (MCU), a programmable logic device (PLD), or another integrated chip.

The foregoing describes the embodiments of this application in detail. Operations in the methods in the embodiments of this application may be sequentially scheduled, combined, or deleted according to an actual requirement. Modules in the apparatus in the embodiments of this application may be divided, combined, or deleted according to an actual requirement.

It should be understood that "one embodiment" or "an embodiment" mentioned in the entire specification does not mean that particular features, structures, or characteristics related to the embodiment are included in at least one embodiment of this application. Therefore, "in one embodiment" or "in an embodiment" appearing in the specification does not refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The term "and/or" in this application describes only an association relationship for describing associated objects and indicates that three relationships may exist. For example, A and/or B may indicate the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined based on A. However, it should be further understood that determining B based on A does not mean that B is determined based on only A. B may alternatively be determined based on A and/or other information.

A person of ordinary skill in the art may be aware that, in combination with the examples described in the embodiments disclosed in this specification, units and algorithm operations may be implemented by electronic hardware, computer software, or a combination thereof. To clearly describe the interchangeability between the hardware and the software, the foregoing has generally described compositions and operations of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, the function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device/server, or the like) to perform all or some of the operations of the methods in the embodiments of this application. The foregoing storage medium includes: any medium that can store program code, such as a USB flash drive, a removable hard disk, a read-only memory, a random access memory, a magnetic disk, or an optical disc.

What is claimed is:

1. A packet processing method, wherein the method comprises:
    classifying, by a first network device of a network system, a plurality of network devices that are separately connected to the first network device into a plurality of groups based on a service, wherein each of the plurality of network devices is a provider edge of the network system and is configured to forward one or more packets of a plurality of packets of the service; and
    forwarding, by the first network device, the packets of the service to one or more of the plurality of network devices in one or more groups in the plurality of groups, wherein the one or more groups are to further forward the packets of the service.

2. The method according to claim 1, wherein the method further comprises:
    determining, by the first network device, the one or more groups in the plurality of groups based on an inter-group forwarding mode.

3. The method according to claim 2, wherein the inter-group forwarding mode is an inter-group load-balancing mode, the determining the one or more groups in the plurality of groups comprises:
    determining one or more of the plurality of groups used for load balancing in the plurality of groups, and forwarding the packets of the service to one or more network devices in the one or more groups used for load balancing.

4. The method according to claim 2, wherein the inter-group forwarding mode is an inter-group active/standby mode, the determining the one or more groups in the plurality of groups comprises:
- determining a first group in the plurality of groups, wherein the first group is a group corresponding to an active mode; and
- forwarding, by the first network device, the packets of the service to one or more network devices in the first group.

5. The method according to claim 4, wherein the plurality of groups obtained through classification further comprise one or more standby groups in the inter-group active/standby mode, and priorities of the one or more standby groups are the same, or priorities of the one or more standby groups are different.

6. The method according to claim 5, wherein after the forwarding, by the first network device, the packets of the service to the one or more network devices in the first group, the method further comprises:
- determining, by the first network device, a second group when the first group is unavailable, wherein the second group belongs to the one or more standby groups; and
- forwarding, by the first network device, the packets of the service to one or more network devices in the second group.

7. The method according to claim 6, wherein the determining, by the first network device, the second group when the first group is unavailable comprises:
- determining, by the first network device, the second group and a third group when the first group is unavailable and priorities of the second group and the third group are the same, wherein the third group belongs to the one or more standby groups; and
- the forwarding, by the first network device, the packets of the service to one or more network devices in the second group comprises:
- forwarding, by the first network device, the packets of the service to the one or more network devices in the second group and one or more network devices in the third group.

8. The method according to claim 1, wherein the one or more groups comprise a first group, and the forwarding the packets of the service to one or more of the plurality of network devices in the one or more groups comprises:
- determining, by the first network device based on an intra-group forwarding mode corresponding to one or more network devices belonging to the first group, the one or more network devices in the first group to forward the packets of the service.

9. The method according to claim 8, wherein the intra-group forwarding mode is an active/standby mode or an all-active mode.

10. The method according to claim 2, wherein before the determining, by the first network device, the one or more groups in the plurality of groups based on an inter-group forwarding mode, the method further comprises:
- obtaining, by the first network device, a configuration instruction, wherein the configuration instruction is used to indicate a plurality of modes corresponding to the plurality of groups; and
- obtaining, by the first network device, the inter-group forwarding mode based on the plurality of modes corresponding to the plurality of groups.

11. The method according to claim 1, wherein the packets of the service are sent to one or more user-side devices, and the plurality of network devices comprised in the plurality of groups each are connected to the one or more user-side devices; or there are a plurality of user-side devices, and the one or more network devices in different groups in the plurality of groups are connected to different user-side devices.

12. The method according to claim 1, wherein the plurality of groups and a plurality of group identifiers have a one-to-one correspondence.

13. The method according to claim 1, wherein the network system is an Ethernet virtual private network, EVPN.

14. A network device, comprising:
- a processor; and
- a memory coupled to the processor and storing instructions, which executed, cause the network device to:
  - classify a plurality of network devices that are separately connected to the network device into a plurality of groups based on a service, wherein each of the plurality of network devices is a provider edge and is configured to forward one or more of a plurality of packets of the service; and
  - forward the packets of the service to one or more of the plurality of network devices in one or more groups in the plurality of groups, wherein the one or more groups are to further forward the packets of the service.

15. The device according to claim 14, wherein the instructions further cause the network device to:
- determine the one or more groups in the plurality of groups based on an inter-group forwarding mode.

16. The device according to claim 15, wherein the inter-group forwarding mode is an inter-group load-balancing mode or an inter-group active/standby mode.

17. The device according to claim 14, wherein the one or more groups comprise a first group, and the forwarding the packets of the service to one or more of the plurality of network devices in the one or more groups comprises:
- determining, based on an intra-group forwarding mode corresponding to one or more network devices belonging to the first group, the one or more network devices in the first group to forward the packets of the service.

18. The device according to claim 17, wherein the intra-group forwarding mode is an active/standby mode or an all-active mode.

19. The device according to claim 15, wherein before the determining, by the network device, the one or more groups in the plurality of groups based on an inter-group forwarding mode, the instructions further cause the network device to:
- obtain a configuration instruction, wherein the configuration instruction is used to indicate a plurality of modes corresponding to the plurality of groups; and
- obtain the inter-group forwarding mode based on the plurality of modes corresponding to the plurality of groups.

20. A computer-readable storage medium, wherein the computer storage medium stores computer-readable instructions, and when the computer-readable instructions are executed by a processor, cause the processor to:
- classify a plurality of network devices that are separately connected to a first network device into a plurality of groups based on a service, wherein each of the plurality of network devices is a provider edge and is configured to forward one or more of a plurality of packets of the service; and
- forward the packets of the service to one or more of the plurality of network devices in one or more groups in the plurality of groups, wherein the one or more groups are to further forward the packets of the service.

* * * * *